United States Patent
Taguchi et al.

[11] Patent Number: 6,139,766
[45] Date of Patent: Oct. 31, 2000

[54] OXIDE MAGNETIC MATERIAL, FERRITE PARTICLE, SINTERED MAGNET, BONDED MAGNET, MAGNETIC RECORDING MEDIUM AND MOTOR

[75] Inventors: Hitoshi Taguchi; Kazumasa Iida; Kikoyuki Masuzawa; Yoshihiko Minachi, all of Chiba, Japan

[73] Assignee: TDK Corporation, Tokyo, Japan

[21] Appl. No.: 09/147,186

[22] PCT Filed: Feb. 25, 1998

[86] PCT No.: PCT/JP98/00764

§ 371 Date: Oct. 26, 1998

§ 102(e) Date: Oct. 26, 1998

[87] PCT Pub. No.: WO98/38654

PCT Pub. Date: Mar. 7, 1998

[30] Foreign Application Priority Data

Feb. 25, 1997 [JP] Japan ..................... 9-056856
Sep. 19, 1997 [JP] Japan ..................... 9-273931

[51] Int. Cl.$^7$ .................................. H01R 1/00
[52] U.S. Cl. ..................... 252/62.57; 252/62.63; 310/46; 428/694 T; 428/694 GT
[58] Field of Search ............. 310/46; 428/694 T, 428/694 GT; 252/62.63, 62.57

[56] References Cited

U.S. PATENT DOCUMENTS

| | | | |
|---|---|---|---|
| 5,607,615 | 3/1997 | Taguchi et al. | 252/62.63 |
| 5,648,039 | 7/1997 | Taguchi et al. | 264/425 |
| 5,811,024 | 9/1998 | Taguchi et al. | 252/62.63 |
| 5,846,449 | 12/1998 | Taguchi et al. | 252/62.63 |
| 5,945,028 | 8/1999 | Taguchi et al. | 252/62.56 |
| 5,951,937 | 9/1999 | Taguchi et al. | 264/427 |
| 5,958,284 | 9/1999 | Takami et al. | 252/62.63 |

FOREIGN PATENT DOCUMENTS 60-63715  4/1985  Japan.

*Primary Examiner*—C. Melissa Koslow
*Attorney, Agent, or Firm*—Oblon, Spivak, McClelland, Maier & Neustadt, P.C.

[57] ABSTRACT

The invention aims to provide a ferrite magnet having a high remanence and a high coercivity which are unachievable with prior art hexagonal ferrite magnets, by realizing a hexagonal ferrite whose saturation magnetization and magnetic anisotropy are both high; a ferrite magnet having a high remanence and a high coercivity as well as significantly improved temperature properties of coercivity and experiencing a minimized drop of coercivity even in a low temperature range; a ferrite magnet having a high remanence and a high coercivity using relatively coarse ferrite particles with a particle diameter in excess of 1 μm; and a magnetic recording medium having a high remanence and thermal stability. To achieve these objects, an oxide magnetic material comprising a primary phase of ferrite with na hexagonal structure and having a composition containing A, R, Fe, and M wherein A is at least one element selected from Sr, Ba, Ca and Pb, with Sr being essentially contained in A, R is at least one element selected from Bi and rare earth elements inclusive of Y, with La being essentially contained in R, and M is Co or Co and Zn, the proportions in total of the respective elements relative to the quantity of the entire metal elements are A: 1–13 at %, R: 0.05–10 at %, Fe: 80–95 at %, and M: 0.1–5 at % is used to construct ferrite particles, sintered magnets, bonded magnets and magnetic recording media.

16 Claims, 24 Drawing Sheets

($Sr_{1-x}La_xFe_{12-y}Co_yO_{19}$)

(x = y IN THE GRAPH)

(x = y IN THE GRAPH)

($Sr_{1-x}La_xFe_{12-x}Co_xO_{19}$)

(x = y IN THE GRAPH)

(x = y IN THE GRAPH)

$(Sr_{0.7}La_{0.3}Fe_{11.7}(Co_{1-y}Zn_y)_{0.3}O_{19})$ $Sr_{1-x}La_xCo_{0.3}Fe_{11.7}O_{19}$ (CALCINING TEMPERATURE 1200°C)

FIG. 21
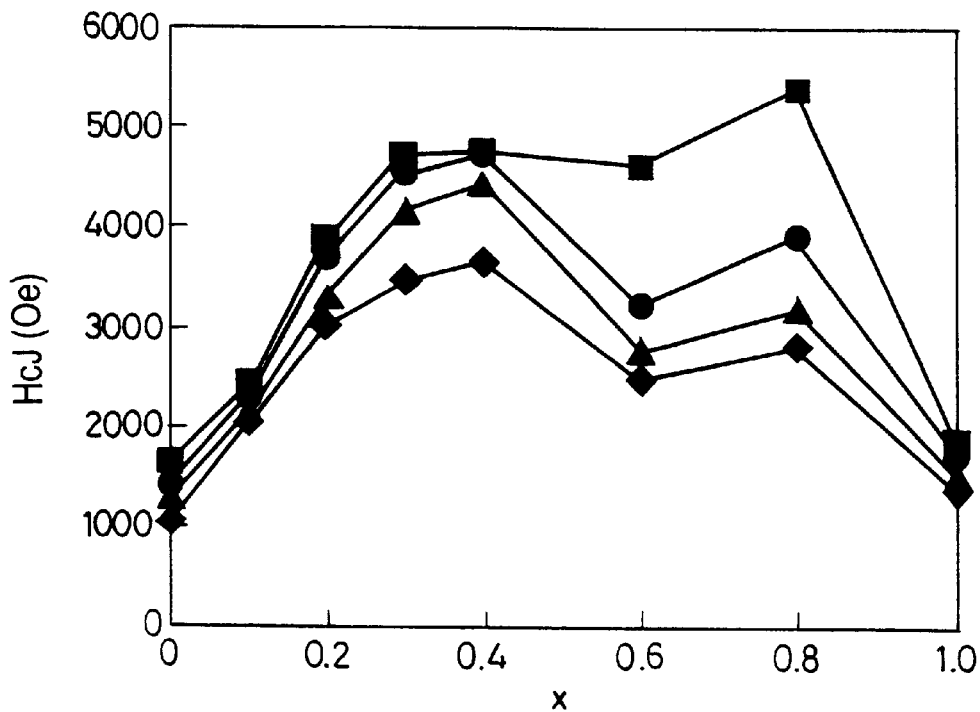
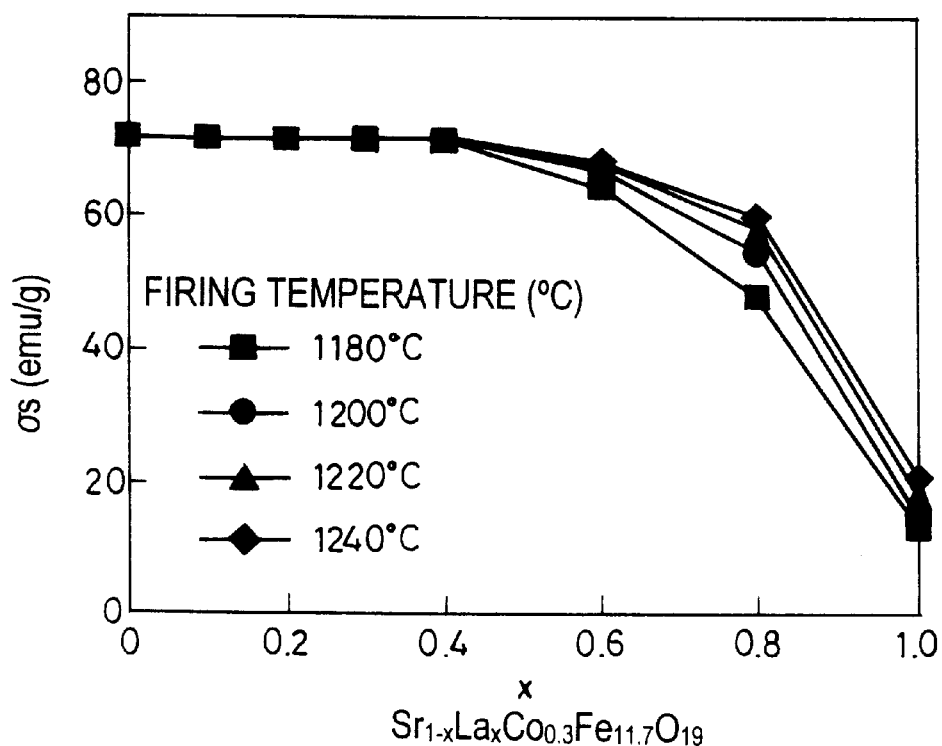
$Sr_{1-x}La_xCo_{0.3}Fe_{11.7}O_{19}$

FIG. 22
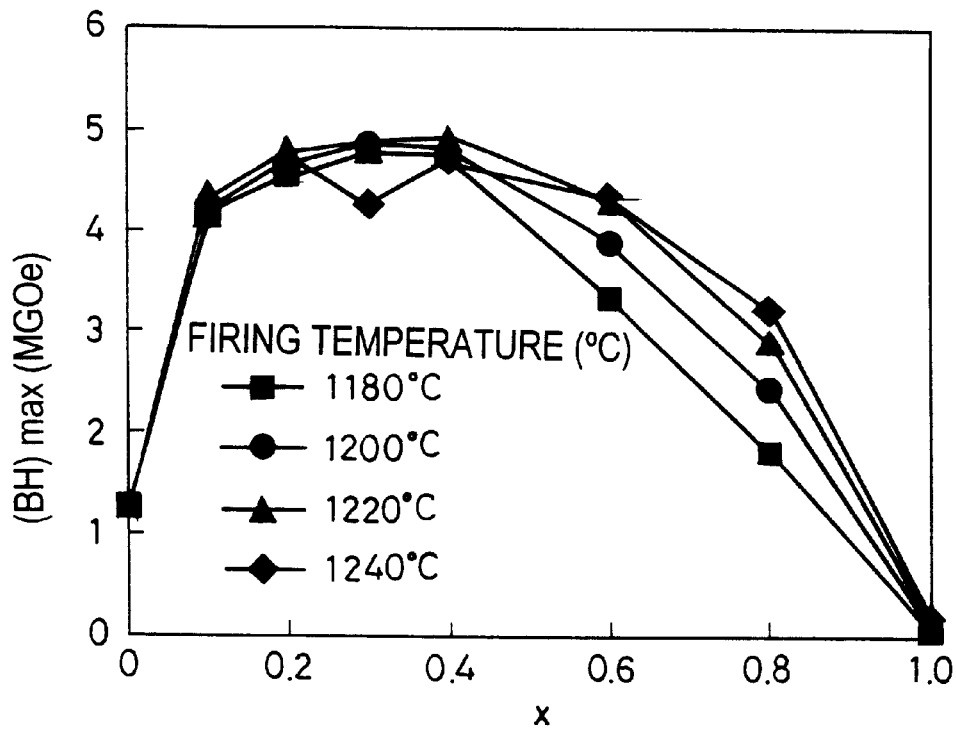
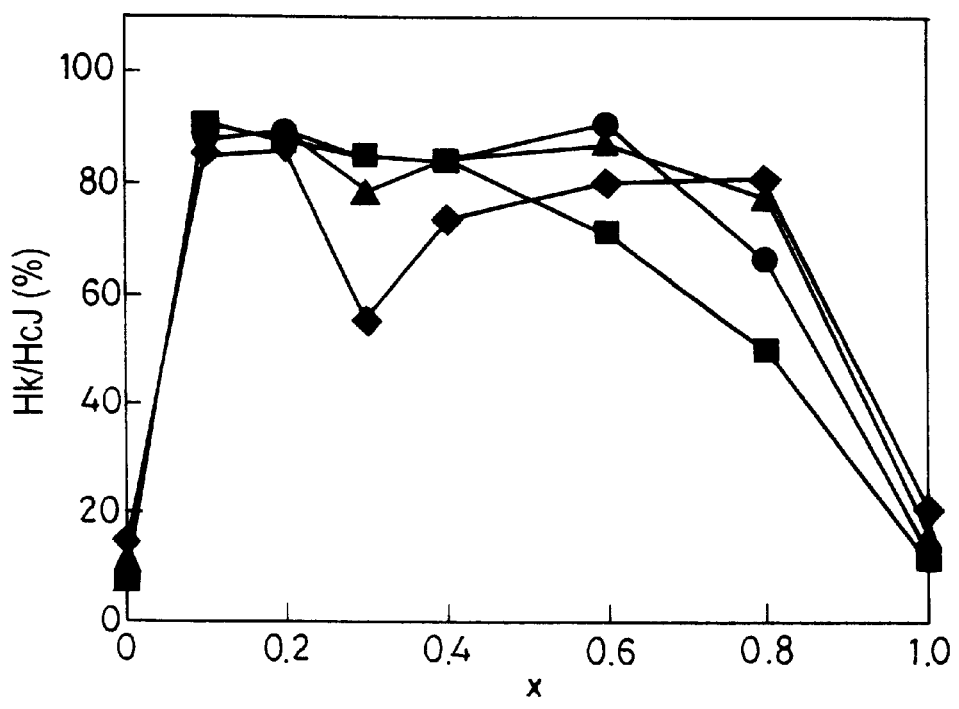
$Sr_{1-x}La_xCo_{0.3}Fe_{11.7}O_{19}$

FIG. 24
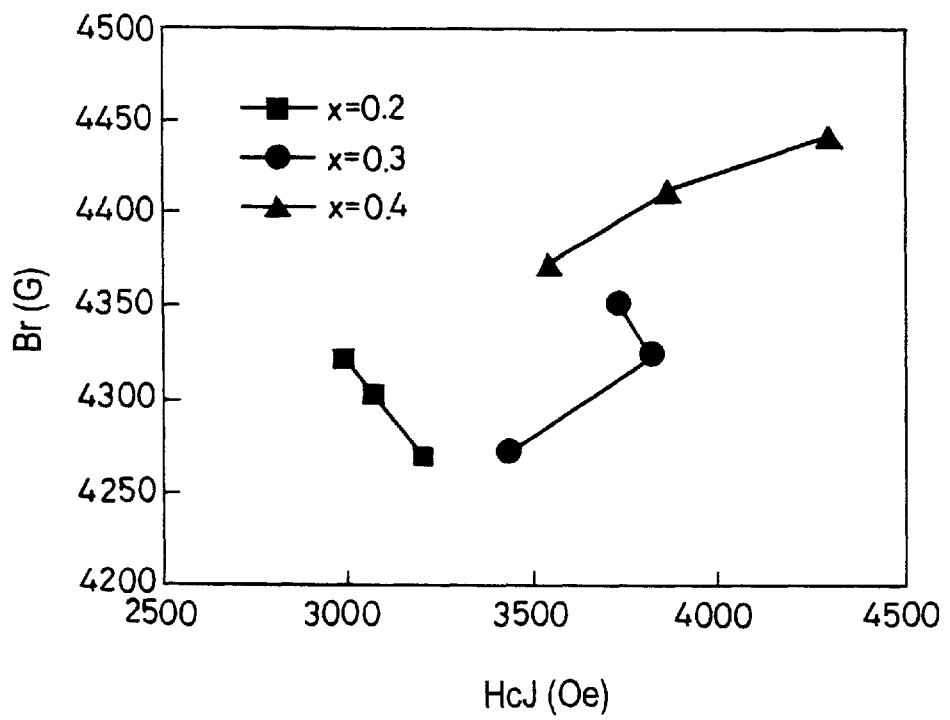
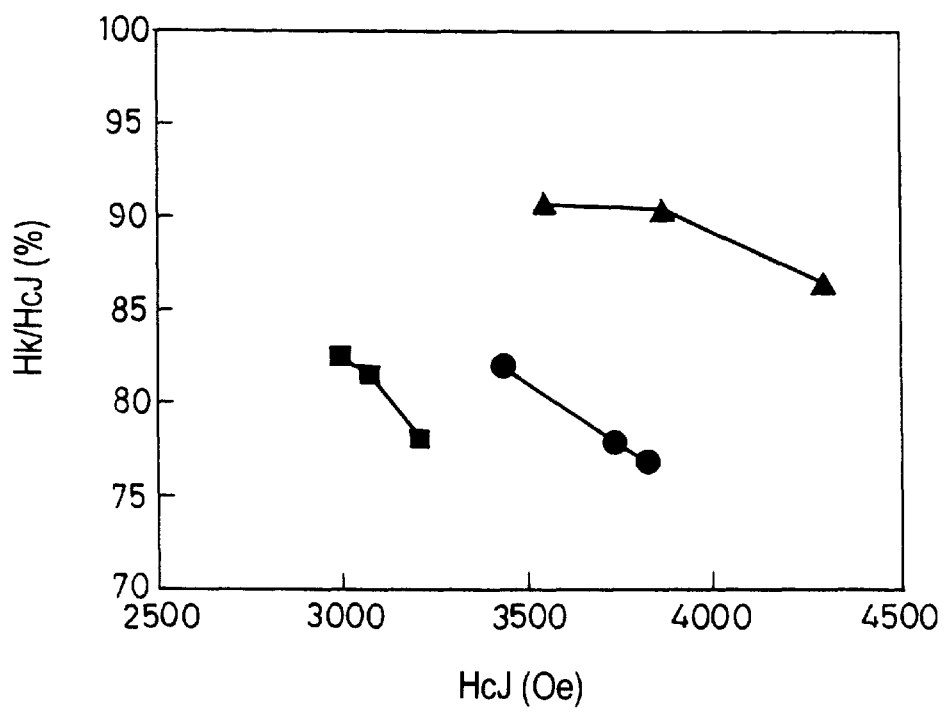
$Sr_{1-x}La_xCo_{0.3}Fe_{11.7}O_{19}$

FIG. 25
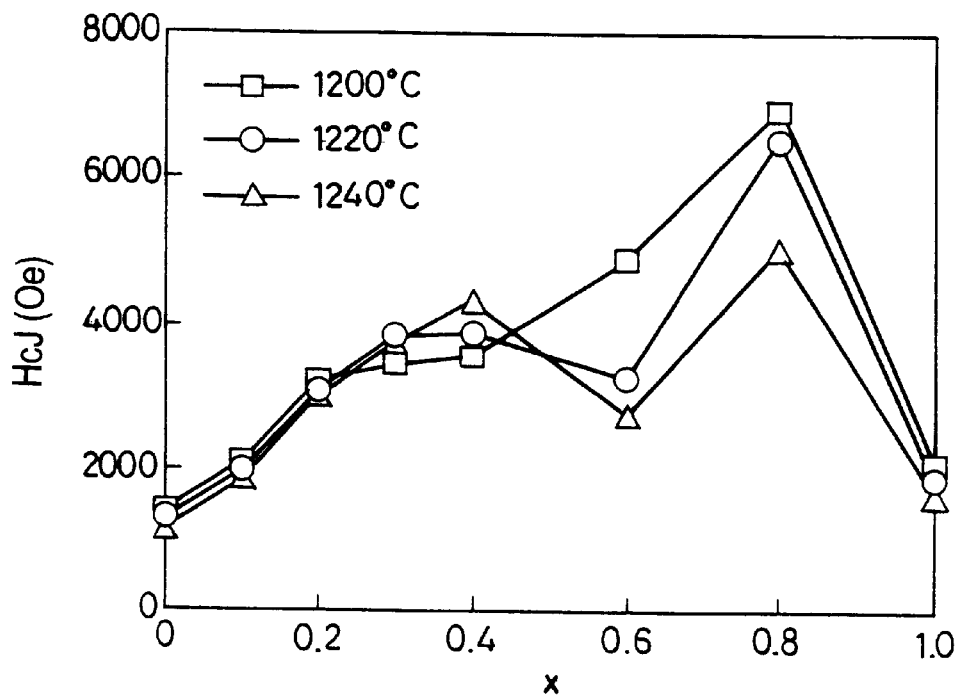
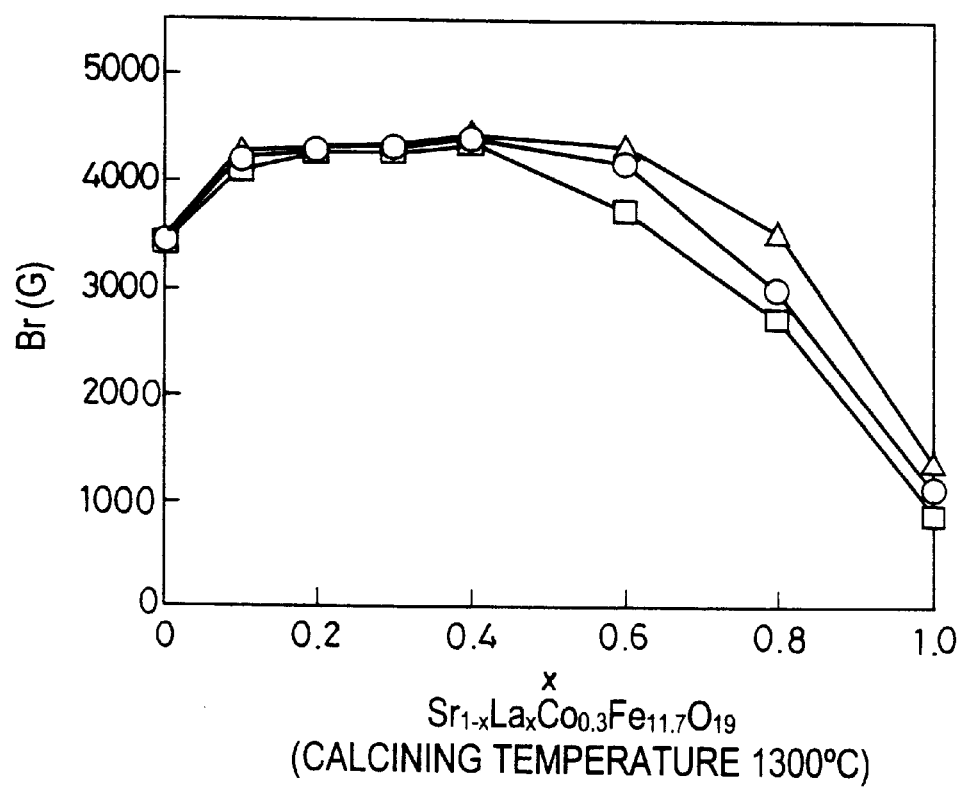
$Sr_{1-x}La_xCo_{0.3}Fe_{11.7}O_{19}$
(CALCINING TEMPERATURE 1300°C)

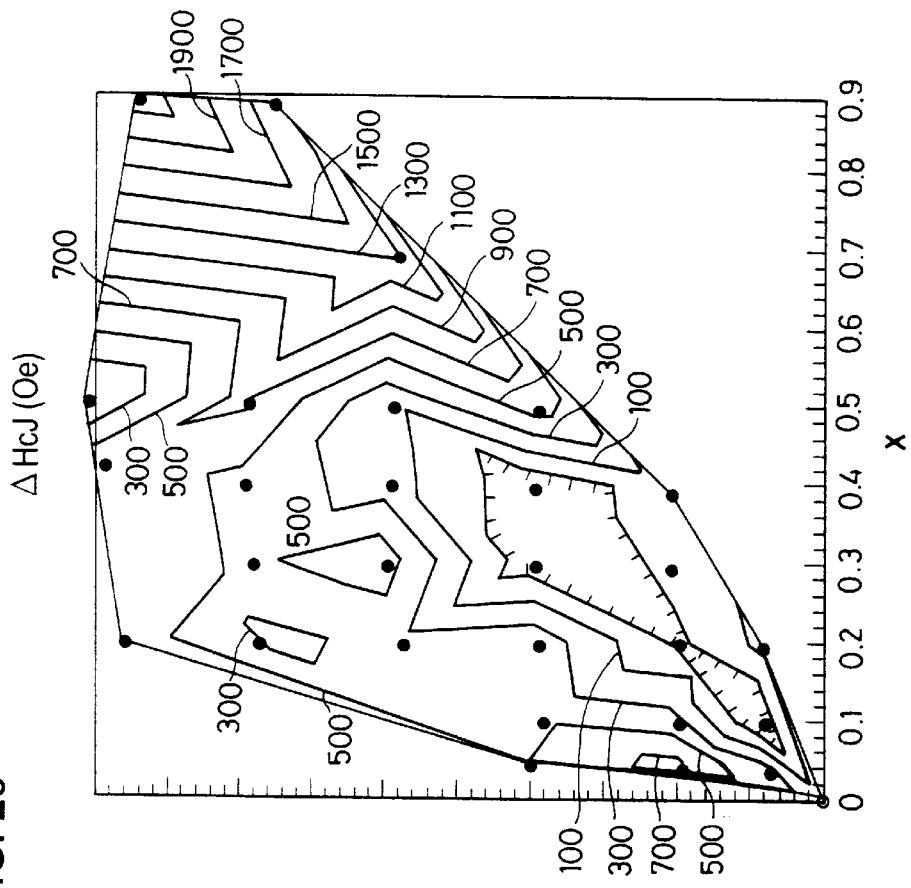
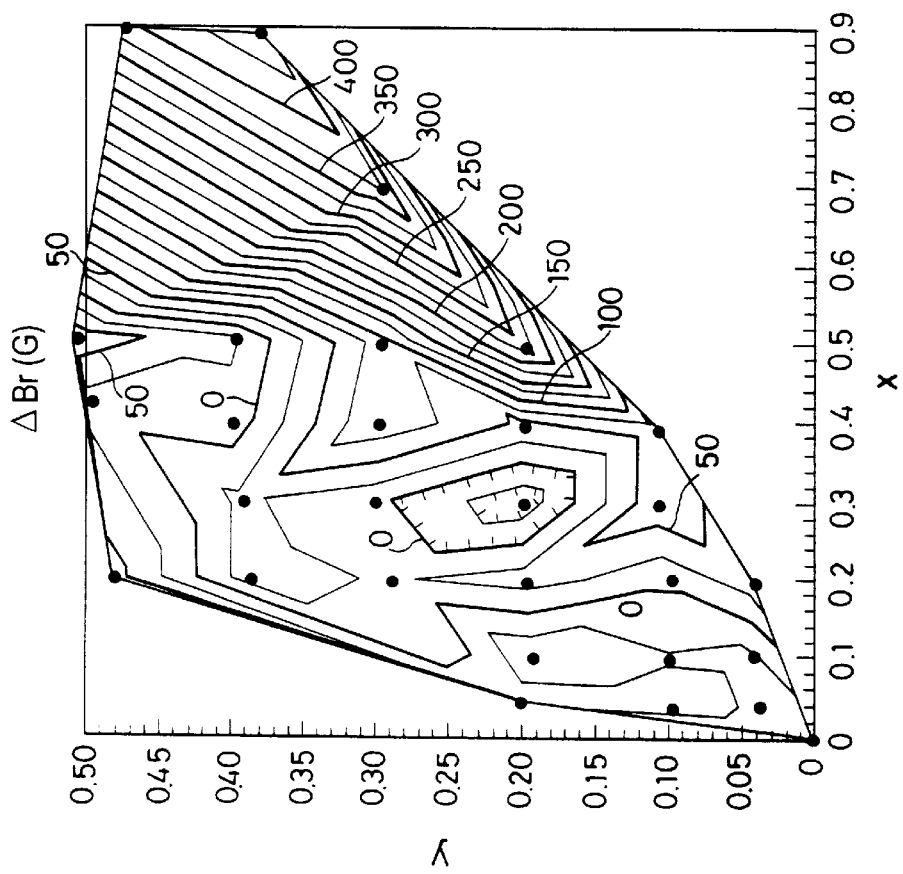
FIG. 28

OXIDE MAGNETIC MATERIAL, FERRITE PARTICLE, SINTERED MAGNET, BONDED MAGNET, MAGNETIC RECORDING MEDIUM AND MOTOR

TECHNICAL FIELD

This invention relates to a magnet powder and a sintered magnet each comprising ferrite, a bonded magnet and a magnetic recording medium each comprising the magnet powder, a magnetic recording medium having a thin film magnetic layer containing a ferrite phase, and a motor using such a magnet.

BACKGROUND ART

Oxide permanent magnet materials include hexagonal strontium ferrite and barium ferrite. Currently, strontium or barium ferrites of the magnetoplumbite type (M type) are mainly used, and they are manufactured into sintered magnets and bonded magnets.

Of magnet properties, a remanence or residual magnetic flux density (Br) and an intrinsic coercivity (HcJ) are most important.

The Br of a magnet is determined by the density and the degree of orientation of the magnet, and the saturation magnetization ($4\pi Is$) which is determined by its crystal structure, and expressed by the equation:

Br=$4\pi Is \times$degree of orientation x density. The strontium and barium ferrites of the M type have a $4\pi Is$ value of about 4.65 kG. The density and the degree of orientation have upper limits of about 98% even in the case of sintered magnets affording the highest values. Therefore, the Br of these magnets is limited to about 4.46 kG. It was substantially impossible in the prior art to achieve Br values of 4.5 kG or higher.

The inventors found in JP-A 115715/1997 that the inclusion of appropriate amounts of La and Zn enables to increase the $4\pi Is$ of M type ferrite by about 200 G at maximum, thereby achieving a Br of at least 4.5 kG. In this case, however, since the anisotropy field (HA) to be described later lowers, it is difficult to acquire a Br of at least 4.5 kG and a HcJ of at least 3.5 kOe at the same time.

HcJ is in proportion to the product ($H_A \times fc$) of the anisotropy field ($H_A=2K_1/Is$) multiplied by a single magnetic domain grain fraction (fc). Herein, $K_1$ is a constant of crystal magnetic anisotropy which is determined by the crystalline structure like Is. M type barium ferrite has a $K_1=3.3\times 10^6$ erg/cm$^3$, and M type strontium ferrite has a $K_1=3.5\times 10^6$ erg/cm$^3$. It is known that M type strontium ferrite has the highest $K_1$ although it is difficult to achieve a further improvement in $K_1$.

On the other hand, if ferrite particles assume a single magnetic domain state, the maximum HcJ is expectable because to reverse the magnetization, the magnetization must be rotated against the anisotropy field. In order that ferrite particles be single magnetic domain particles, the size of ferrite particles must be reduced to or below the critical diameter (dc) given by the following expression:

$$dc=2(k \cdot Tc \cdot K_1/a)^{1/2}/Is^2$$

Herein, k is the Boltzmann constant, Tc is a Curie temperature, and a is a distance between iron ions. Since M type strontium ferrite has a dc of about 1 μm, it is necessary for the manufacture of sintered magnets, for example, to control the crystal grain size of a sintered body to 1 μm or less. Although it was difficult in the prior art to realize such fine crystal grains at the same time as increasing the density and the degree of orientation for achieving higher Br, the inventors proposed a new preparation method in JP-A 53064/1994 and demonstrated the obtainment of better properties which were not found in the prior art. Even in this method, however, HcJ approximates to 4.0 kOe when Br is 4.4 kG, and it is difficult to simultaneously achieve a high HcJ of at least 4.5 kOe while maintaining a high Br of at least 4.4 kG.

In order to control the crystal grain size of a sintered body to 1 μm or less, the particle size at the molding stage should preferably be controlled to 0.5 μm or less when grain growth in the sintering stage is taken into account. The use of such fine particles generally gives rise to a productivity decline because the molding time is extended and more cracks occur upon molding. It is thus very difficult to find a compromise between property enhancement and high productivity.

Still further, it was known in the prior art that the addition of $Al_2O_3$ and $Cr_2O_3$ is effective for achieving high HcJ. In this case, $Al^{3+}$ and $Cr^{3+}$ are effective for increasing $H_A$ and restraining grain growth by substituting for Fe3+ having an "upward" spin in the M type structure, thereby achieving a high HcJ of at least 4.5 kOe. However, as Is lowers, the sintered density is also likely to decline, resulting in a significant decline of Br. Consequently, for compositions providing a HcJ of 4.5 kOe, only a Br of about 4.2 kG is available at the highest.

Meanwhile, conventional M type ferrite sintered magnets had a temperature dependency of HcJ of about +13 Oe/° C. and a relatively high temperature coefficient of about +0.3 to +0.5%/° C. This leads to a likelihood of demagnetization that HcJ experiences a great decline on the lower temperature side. To prevent such demagnetization, HcJ at room temperature must be as great as about 5 kOe, for example, and it is then substantially impossible to obtain high Br at the same time. The temperature dependency of HcJ of M type ferrite powder, which is superior to that of anisotropic sintered magnets, is still of the order of at least +8 Oe/° C., and its temperature coefficient is at least +0.15%/° C., and it is then difficult to further improve the temperature properties.

The inventors proposed in JP-A 53064/1994 that by pulverizing ferrite particles to introduce crystal strains, the temperature change rate of HcJ can be reduced. In this case, however, the HcJ of particles is also reduced at the same time. It is then difficult to acquire high HcJ and excellent temperature properties of HcJ at the same time even when M type strontium ferrite of submicron size is used.

Since ferrite magnets are well resistant to the surrounding environment and inexpensive too, they are often used in motors for use in various portions of automobiles. Since automobiles can be used in very cold or very hot environments, the motors are required to perform stable operation under such severe environments. Conventional ferrite magnets, however, have the problems that a substantial decline of coercivity occurs in a low-temperature environment as previously mentioned, and irreversible demagnetization called "low-temperature demagnetization" can occur.

DISCLOSURE OF THE INVENTION

An object of the invention is to provide a ferrite magnet having a high remanence and a high coercivity which are unachievable with prior art hexagonal ferrite magnets, by realizing a hexagonal ferrite whose saturation magnetization and magnetic anisotropy are both high. Another object of the invention is to provide a ferrite magnet having a high remanence and a high coercivity as well as significantly improved temperature properties of coercivity and experiencing a minimized drop of coercivity even in a low temperature range. A further object of the invention is to provide a ferrite magnet having a high remanence and a high coercivity using relatively coarse ferrite particles with a particle size in excess of 1 μm. A still further object of the invention is to provide a magnetic recording medium having a high remanence and thermal stability. A yet further object of the invention is to provide a motor having a high efficacy and high torque which can be reduced in size and weight.

These and other objects are achieved by one of the constructions defined below as (1) to (16).

(1) An oxide magnetic material comprising a primary phase of ferrite with a hexagonal structure and having a composition containing A, R, Fe, and M wherein A is at least one element selected from the group consisting of strontium, barium, calcium and lead, with strontium being essentially contained in A, R is at least one element selected from the group consisting of bismuth and rare earth elements inclusive of yttrium, with lanthanum being essentially contained in R, and M is cobalt or cobalt and zinc, the proportions in total of the respective elements relative to the quantity of the entire metal elements are
A: 1 to 13 at %,
R: 0.05 to 10 at %,
Fe: 80 to 95 at %, and
M: 0.1 to 5 at %.

(2) The oxide magnetic material of (1) which is represented by formula (I):

$$A_{1-x}R_x(Fe_{12-y}M_y)_zO_{19}$$

wherein $0.04 \leq x \leq 0.9$, $0.04 \leq y \leq 0.5$, and $0.7 \leq z \leq 1.2$.

(3) The oxide magnetic material of (1) wherein the proportion of cobalt in M is at least 10 at %.

(4) Ferrite particles comprising the oxide magnetic material of (1).

(5) The ferrite particles of (4) wherein the oxide magnetic material is represented by formula (I):

$$A_{1-x}R_x(Fe_{12-y}M_y)_zO_{19}$$

wherein $0.04 \leq x \leq 0.9$, $0.04 \leq y \leq 0.5$, $0.8 \leq x/y \leq 20$, and $0.7 \leq z \leq 1.2$.

(6) Ferrite particles comprising A, R, Fe, and M wherein

A is at least one element selected from the group consisting of strontium, barium, calcium and lead, with strontium being essentially contained in A, R is at least one element selected from the group consisting of bismuth and rare earth elements inclusive of yttrium, with lanthanum being essentially contained in R, and M is cobalt or cobalt and zinc,
said ferrite particles having an intrinsic coercivity (HcJ) and a temperature dependency of coercivity (Oe/° C.) which satisfy the formula (III):

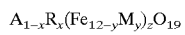

wherein $|\Delta HcJ/\Delta T|$ represents the magnitude of the -temperature dependency (Oe/° C.) of the intrinsic coercivity (HcJ) between −50° C. and 50° C., and the unit of HcJ is expressed in kOe.

(7) A bonded magnet comprising the ferrite particles of (4).

(8) A sintered magnet comprising the oxide magnetic material of (1).

(9) The sintered magnet of (8) wherein the oxide magnetic material is represented by formula (II):

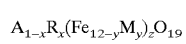

wherein $0.04 \leq x \leq 0.9$, $0.04 \leq y \leq 0.5$, $0.4 \leq x/y \leq 4$, and $0.7 \leq z \leq 1.2$.

(10) The sintered magnet of (8) having an intrinsic coercivity HcJ (unit kOe) and a remanence Br (unit kG) at 25° C. which satisfy the formula (IV):

$$Br + \tfrac{1}{3}HcJ \geq 5.75$$

when $HcJ \geq 4$, and the formula (V):

$$Br + \tfrac{1}{10}HcJ \geq 4.82$$

when $HcJ < 4$.

(11) The sintered magnet of (8) having a coercivity HcJ (unit kOe) and a remanence Br (unit kG) at −25° C. which satisfy the formula (VI):

$$Br + \tfrac{1}{3}HcJ \geq 5.95.$$

(12) The sintered magnet of (8) wherein the magnitude of a temperature coefficient of coercivity between −50° C. and 50° C. is up to 0.25%/° C.

(13) A sintered magnet comprising A, R, Fe, and M wherein

A is at least one element selected from the group consisting of strontium, barium, calcium and lead, with strontium being essentially contained in A, R is at least one element selected from the group consisting of bismuth and rare earth elements inclusive of yttrium, with lanthanum being essentially contained in R, and M is cobalt or cobalt and zinc,
said sintered magnet having a coercivity HcJ (unit koe) and a remanence Br (unit kG) which satisfy the formula (IV):

$$Br + \tfrac{1}{3}HcJ \geq 5.75$$

when $HcJ \geq 4$, and the formula (V):

$$Br + \tfrac{1}{10}HcJ \geq 4.82$$

when $HcJ < 4$.

(14) A sintered magnet comprising A, R, Fe, and M wherein

A is at least one element selected from the group consisting of strontium, barium, calcium and lead, with strontium being essentially contained in A, R is at least one element selected from the group consisting of bismuth and rare earth elements inclusive of yttrium, with lanthanum being essentially contained in R, and M is cobalt or cobalt and zinc,
said sintered magnet having a coercivity HcJ (unit kOe) and a remanence Br (unit kG) at -25°C which satisfy the formula (VI):

$$Br + \tfrac{1}{3}HcJ \geq 5.95.$$

(15) A motor comprising the sintered magnet of (8).

(16) A magnetic recording medium comprising a thin film magnetic layer containing the oxide magnetic material of (1).

FUNCTION AND EFFECT

According to the invention, the composition of hexagonal strontium ferrite is adjusted such that at least lanthanum and cobalt are contained in optimum amounts as shown by any of the above-described formulae. As a consequence, by increasing Is rather than lowering Is, and by increasing $K_1$ at the same time, $H_A$ can be increased, thereby realizing high Br and high HcJ. More illustratively, the sintered magnets of the invention readily acquire properties satisfying the above formula (IV) or (V) at room temperature or about 25° C. For prior art strontium ferrite sintered magnets, the achievement of Br 4.4 kG and HcJ 4.0 kOe was reported, but no magnets having HcJ of at least 4 kOe and satisfying the above formula (IV) were available. This is because increasing HcJ leads to a lowering of Br. When cobalt and zinc are added in admixture to the sintered magnets of the invention, the coercivity becomes lower than when cobalt is added alone and even below 4 kOe whereas the remanence significantly improves. Then magnetic properties satisfying the above formula (V) are obtained. In the prior art, strontium ferrite sintered magnets having a HcJ of lower than 4 kOe and satisfying the above formula (V) have not been available.

The ferrites according to the invention have a greater anisotropy constant ($K_1$) or anisotropy field ($H_A$) than prior art ferrites. Then the inventive ferrites provide greater HcJ if the particle size is equal and allows the particle size to be greater if an equal HcJ is desired. For example, sintered bodies can provide a HcJ of at least 4.5 kOe when they have a mean particle size of 0.3 to 1 $\mu$m, and a HcJ of at least 3.5 kOe even when they have a mean particle size of 1 to 2 $\mu$m. Then the comminution time and molding time can be reduced, and an improvement in product yield also becomes possible.

The M type ferrites of the composition according to the invention achieve an increase by about 2% of saturation magnetization (4$\mu$Is) and an increase by 10 to 20% at maximum of crystal magnetic anisotropy constant ($K_1$) or anisotropy field ($H_A$) The precision measurement of crystal magnetic anisotropy constant ($K_1$) or anisotropy field ($H_A$) is not easy and the established method has not been available. Exemplary methods include a method of computing crystal magnetic anisotropy constants ($K_1$, $K_2$, etc.) by measuring and analyzing a torque curve of an anisotropic sample by means of a torque meter, a method of separately measuring initial magnetization curves of an anisotropic sample in the direction of easy magnetization (c axis) and the direction of difficult magnetization (a axis) and determining the anisotropy field ($H_A$) from the intersection therebetween, and a method of computing from the second order differential of an initial magnetization curve of an anisotropic sample in the direction of difficult magnetization (a axis).

When the anisotropy field ($H_A$) of a magnet according to the invention is determined by a method of separately measuring initial magnetization curves of an anisotropic sample in the direction of easy magnetization (c axis) and the direction of difficult magnetization (a axis) and determining the anisotropy field ($H_A$) from the intersection therebetween, there are obtained high $H_A$ values of at least 19 kOe and even more than 20 kOe at maximum as will be shown in Table 6. This is an improvement by at least 10% at maximum over strontium ferrites of prior art compositions.

Greater HcJ improvements are achieved particularly when the invention is applied to sintered magnets although ferrite particles prepared according to the invention may be mixed with binders such as plastics and rubber to form bonded magnets.

The ferrite particles and sintered magnets according to the invention have reduced temperature dependency of HcJ, and particularly, the ferrite particles according to the invention have minimized temperature dependency of HcJ. More illustratively, for the sintered magnets according to the invention, the magnitude of the temperature coefficient of HcJ between –50° C. and 50° C. is 12 Oe/° C. or less (0.25%/° C. or less), and can easily be reduced to 9 Oe/° C. or less (0.20%/° C. or less). For the ferrite particles according to the invention, the magnitude of the temperature coefficient of HcJ between –50° C. and 50° C. is 7 Oe/° C. or less (0.1%/° C. or less), and can easily be reduced to 5 Oe/° C. or less (0.05%/° C. or less), and it is even possible to reduce the temperature coefficient to zero. On account of such improved temperature properties of HcJ, magnetic properties satisfying the above formula (VI) at –25° C. are obtained. Such high magnetic properties in a low-temperature environment could not be achieved by prior art strontium ferrite magnets.

The present invention further encompasses a coating type magnetic recording medium comprising a magnetic layer having the above-defined ferrite particles dispersed in a binder. Also encompassed in the invention is a magnetic recording medium comprising a thin film magnetic layer having the same hexagonal magnetoplumbite type ferrite phase as the above-described magnets. In either case, a magnetic recording medium featuring a high output and high S/N is realized by taking advantage of the high remanence of the ferrite particles or phase. Also, since the magnetic recording medium may be utilized as a perpendicular magnetic recording medium, the record density can be increased. Further, since the magnitude of the temperature coefficient of HcJ is reduced, a magnetic recording medium which is thermally stable too can be realized.

Meanwhile, Bull. Acad. Sci. USSR, Phys. Ser. (English Transl.), vol. 25, (1961) pp. 1405–1408 (Reference 1, hereinafter) describes a barium ferrite represented by $$Ba_{1-x}M^{3+}{}_xFe_{12-x}M^{2+}{}_xO_{19}.$$

In this barium ferrite, $M^{3+}$ is $La^3$, $Pr^{3+}$ or $Bi^{3+}$, and $M^{2+}$ is $Co^{2+}$ or $Ni^{2+}$. It is indefinite whether the barium ferrite of Reference 1 takes the form of powder or sintered body, it is analogous to the strontium ferrite of the present invention in that lanthanum and cobalt are contained. FIG. 1 of Reference 1 shows how the saturation magnetization of barium ferrite containing lanthanum and cobalt varies with a change of x. It is seen from FIG. 1 that the saturation magnetization decreases with an increase of x. Also Reference 1 describes that the coercivity is increased several times, but lacks numerical data.

In contrast, by using the composition in which optimum amounts of lanthanum and cobalt are contained in strontium ferrite sintered magnet, the present invention realizes a substantial improvement in HcJ and a slight increase of Br and accomplishes a substantial improvement in the temperature dependency of HcJ. Furthermore, by containing optimum amounts of lanthanum and cobalt in strontium ferrite magnet powder, the present invention increases the HcJ and substantially reduces the temperature dependency of HcJ. It was first discovered by the present inventors that these benefits are obtained when the combined addition of lanthanum and cobalt is applied to strontium ferrite.

Indian Journal of Pure & Applied Physics, Vol. 8, July 1970, pp. 412–415 (Reference 2, hereinafter) describes a ferrite of the formula:

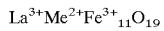

wherein $Me^{2+}$ is $Cu^{2+}$, $Cd^{2+}$, $Zn^{2+}$, $Ni^{2+}$, $Co^{2+}$ or $Mg^{2+}$. This ferrite coincides with the ferrite particles and sintered magnets of the present invention in that lanthanum and cobalt are simultaneously contained. In Reference 2, however, the saturation magnetization as of the ferrite is as low as 42 cgs unit at room temperature and 50 cgs unit at OK when $Me^{2+}$ is $Co^{2+}$. Also, it is described in Reference 2 that this ferrite cannot be used as a magnet material because of low coercivity although measurement values are lacking. These are probably because the composition of the ferrite described in Reference 2 (too much contents of lanthanum and cobalt) is outside the scope of the present invention.

JP-A 100417/1987 (Reference 3, hereinafter) describes equiaxed hexaferrite pigments of the composition represented by the formula:

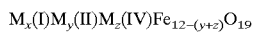

wherein M(I) is a mixture of Sr, Ba or rare earth metals with a monovalent cation, M(II) is Fe(II), Mn, Co, Ni, Cu, Zn, Cd or Mg, and M(IV) is Ti or the like. The hexaferrite pigments described in Reference 3 coincide with the ferrite particles and sintered magnets of the present invention in that rare earth metals and cobalt are contained at the same time. Reference 3, however, describes nowhere examples in which lanthanum and cobalt are simultaneously added and lacks the description that the co-addition of these elements is effective for improving both saturation magnetization and coercivity. In the examples of Reference 3 where cobalt is added, titanium is simultaneously added as element M(IV). Since element M(IV), especially titanium is an element which can lower both saturation magnetization and coercivity, it is apparent that Reference 3 does not teach the construction and benefits of the present invention.

JP-A 119760/1987 (Reference 4, hereinafter) describes a magnetooptical recording material of magnetoplumbite type barium ferrite characterized in that Ba is partially replaced by La and Fe is partially replaced by Co. This barium ferrite appears analogous to the strontium ferrite of the present invention in that lanthanum and cobalt are contained. The ferrite of Reference 4, however, is a material for "magnetooptical recording" by the mode that magnetic domains are written in a magnetic thin film for recording information by utilizing the thermal effect of light and the information is read out by utilizing the magnetooptical effect, and belongs to a different technical field from the magnets and "magnetic recording" materials of the present invention. Further, Reference 4 merely describes the compositional formula (I) wherein Ba, La and Co are essential and compositional formulae (II) and (IV) wherein tetravalent or more valent metal ions (though not specified) are additionally added. In contrast, the ferrites of the present invention are different from the composition of Reference 4 in that the invention pertains to strontium ferrites essentially containing strontium to which appropriate amounts of lanthanum and cobalt are added. That is, as previously described in conjunction with Reference 1, the strontium ferrites of the present invention realize a substantial improvement in HcJ and a slight increase of Br and accomplish a substantial improvement in the temperature dependency of HcJ by using the composition of strontium ferrite in which optimum amounts of lanthanum and cobalt are contained. These benefits were first achieved by the composition of the present invention which is different from Reference 4.

JP-B-42128/1992, (Reference 5) describes that a ferrite sintered body having high coercivity can be prepared by adding CaO, $SiO_2$, CoO or one or both of $Cr_2O_3$ and $Al_2O_3$ to a calcined body of M type barium, strontium or praseodymium ferrite. However, no reference is made to rare earth elements such as lanthanum. The magnetic properties described in examples are poor. A comparison between samples with an equal Br reveals that HcJ is merely improved by about 100 Oe. This is because rare earth elements such as lanthanum are not contained as opposed to the present invention. The ferrite described in Reference 5 is apparently different form the ferrite of the present invention.

BRIEF DESCRIPTION OF THE DRAWINGS

FIG. 21 is a graph comparing magnetic properties achieved with different amounts of La added, illustrating ps and HcJ at a calcining temperature of 1,200° C.

FIG. 22 is a graph comparing magnetic properties achieved with different amounts of La added, illustrating Hk/HcJ and (BH)max at a calcining temperature of 1,200° C.

FIG. 24 is a graph comparing magnetic properties achieved with different amounts of La added, illustrating HcJ, Hk/HcJ and Br at a calcining temperature of 1,300° C.

FIG. 25 is a graph comparing magnetic properties achieved with different amounts of La added, illustrating Br and HcJ versus x at a calcining temperature of 1,300° C.

FIG. 28 is a diagram plotting the HcJ of sintered bodies obtained by firing the calcined bodies of FIG. 26 at an oxygen concentration of 100% minus the HcJ of sintered bodies obtained by firing at an oxygen concentration of 20%.

BEST MODE FOR CARRYING OUT THE INVENTION

Figure 1:
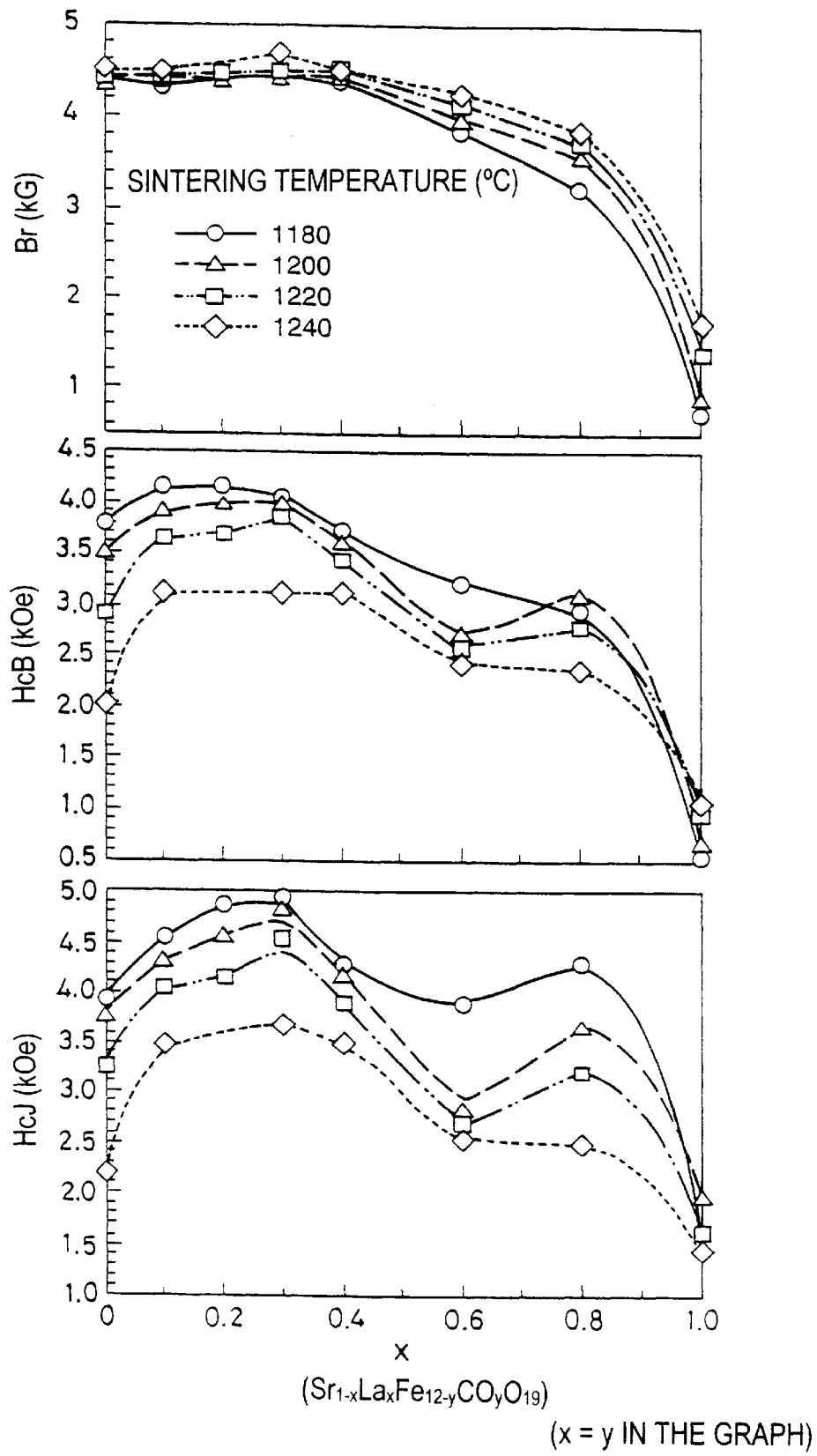
FIG. 1 is a graph showing the magnetic characteristics of strontium ferrite sintered bodies versus the substitution (x, y) of La and Co.

The oxide magnetic material of the invention comprises a primary phase of hexagonal ferrite, preferably hexagonal magnetoplumbite type (M type) ferrite. It has a composition containing A, R, Fe, and M wherein A is at least one element selected from the group consisting of strontium, barium, calcium and lead, with strontium being essentially contained in A, R is at least one element selected from the group consisting of bismuth and rare earth elements inclusive of yttrium, with lanthanum being essentially contained in R, and M is cobalt or cobalt and zinc, the proportions in total of the respective elements relative to the quantity of the entire metal elements are:

A: 1 to 13 at %,
R: 0.05 to 10 at %,
Fe: 80 to 95 at %, and
M: 0.1 to 5 at %.

The preferred composition is:

A: 3 to 11 at %,
R: 0.2 to 6 at %,
Fe: 83 to 94 at %, and
M: 0.3 to 4 at %.

The more preferred composition is:

A: 3 to 9 at %,
R: 0.5 to 4 at %,
Fe: 86 to 93 at %, and
M: 0.5 to 3 at %.

With respect to the constituent elements, A is at least one element selected from the group consisting of strontium, barium, calcium and lead and essentially contains strontium. At too less contents of A, M type ferrite does not form or more non-magnetic phases such as $\alpha$-$Fe_2O_3$ form. At too high contents of A, M type ferrite does not form or more non-magnetic phases such as $SrFeO_{3-x}$ form. The proportion of Sr in A is preferably at least 51 at %, more preferably at least 70 at %, and most preferably 100 at %. At too low Sr proportions in A, it would become impossible to achieve both an improvement in saturation magnetization and a significant improvement in coercivity R is at least one element selected from the group consisting of bismuth and rare earth elements inclusive of yttrium. Lanthanum is essentially contained in R. Too low contents of R form a smaller amount of solid solution of M, failing to achieve the benefits of the invention. At too high contents of R, more non-magnetic hetero phases such as ortho-ferrite form. The proportion of La in R is preferably at least 40 at %, more preferably at least 70 at %, while it is most preferable to use only lanthanum as R in order to improve saturation magnetization. This is because lanthanum is the highest when the limit of solid solubility in hexagonal M type ferrite is compared. Accordingly, at too low La proportions in R, the amount of solid solution of R cannot be increased and as a consequence, the amount of solid solution of M cannot be increased as well, detracting from the benefits of the invention. Also, the co-presence of bismuth is advantageous in productivity because the calcining and sintering temperatures can be lowered.

Element M is cobalt or a mixture of cobalt and zinc. Too low contents of M fail to achieve the benefits of the invention whereas too high contents of M rather reduce Br and HcJ, failing to achieve the benefits of the invention. The proportion of Co in M is preferably at least 10 at %, more preferably at least 20 at %. Too low proportions of Co would achieve an insufficient improvement in coercivity.

Also preferably, when the oxide magnetic material of the invention is represented by formula (I):

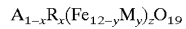

$A_{1-x}R_x(Fe_{12-y}M_y)_zO_{19}$ wherein x, y and z represent molar numbers, it satisfies the range:

$0.04 \leq x \leq 0.9$, especially $0.04 \leq x \leq 0.6$,
$0.04 \leq y \leq 0.5$, and
$0.7 \leq z \leq 1.2$.

The more preferred range is:

$0.04 \leq x \leq 0.5$,
$0.04 \leq y \leq 0.5$, and
$0.7 \leq z \leq 1.2$.

The further preferred range is:

$0.1 \leq x \leq 0.4$,
$0.1 \leq y \leq 0.4$, and
$0.8 \leq z \leq 1.1$, especially $0.9 \leq z \leq 1.05$.

In formula (I), if x is too small, that is, if the amount of element R is too small, the amount of element M forming a solid solution with hexagonal ferrite cannot be increased, resulting in an insufficient improvement in saturation magnetization and/or anisotropy field. If x is too large, the excess of element R cannot form a substitutional solid solution with hexagonal ferrite and, for example, ortho-ferrite containing element R forms to detract from saturation magnetization. If y is too small, there results an insufficient improvement in saturation magnetization and/or anisotropy field. If y is too large, the excess of element M cannot form a substitutional solid solution with hexagonal ferrite. Even within the range where element M can form a substitutional solid solution, there would result substantial losses of anisotropy constant ($K_1$) and anisotropy field ($H_A$). If z is too small, the amount of a non-magnetic phase containing strontium and element R increases, resulting in low saturation magnetization. If z is too large, the amount of an $\alpha$-$Fe_2O_3$ phase or non-magnetic spinel ferrite phase containing element M increases, resulting in low saturation magnetization. It is noted that the above formula (I) is defined on the assumption that no impurities are contained.

In the above formula (I) representative of the composition, the molar number of oxygen (O) is 19. This formula represents the stoichiometric compositional ratio where R's are all trivalent, x=y, and z=1. The molar number of oxygen varies depending on the type of R and the values of x, y and z. Also, where the firing atmosphere is a reducing atmosphere, for example, there is a possibility of leaving oxygen vacancies. Furthermore, iron is normally present as trivalent one in the M type ferrite, but can change to divalent one. There is also a possibility that the element represented by M such as cobalt change its valence. Because of these possibilities, the ratio of oxygen to the metal elements varies. Although it is described in the present specification that the molar number of oxygen (O) is 19 regardless of the type of R and the values of x, y and z, the actual molar number of oxygen may somewhat deviate from the stoichiometric compositional ratio. For example, it is believed that if divalent iron forms in strontium ferrite, the ferrite lowers its resistivity ($Fe^{2+} \rightarrow Fe^{3+} + e^-$). In the event of polycrystals, the grain boundary resistance is usually greater than the transgranular resistance, on account of which the actual resistivity of sintered magnets can vary.

The composition of the oxide magnetic material can be measured by fluorescent x-ray quantitative analysis. The presence of the primary phase can be confirmed by x-ray diffractometry.

The oxide magnetic material may contain $B_2O_3$. The inclusion of $B_2O_3$ is effective for lowering the calcining and sintering temperatures and thus advantageous from the productivity standpoint. The content of $B_2O_3$ is preferably up to 0.5% by weight based on the oxide magnetic material. Too large contents of $B_2O_3$ would lead to lower saturation magnetization.

In the oxide magnetic material, there may be contained at least one of sodium, potassium and rubidium. When these elements are calculated as $Na_2O$, $K_2O$ and $Rb2O$, the sum of their contents is preferably up to 3% by weight of the entire oxide magnetic material. If their contents are too high, saturation magnetization would become lower. Where MI represents these elements, $M^1$ is contained in the oxide magnetic material, for example, in the form of

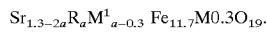

$Sr_{1.3-2a}R_aM^1{}_{a-0.3}Fe_{11.7}M0.3O_{19}$.

In this case, a is preferably in the range: 0.3<a<0.5. Too large values of a would give rise to the problems that saturation magnetization is low and more element MI evaporates off upon firing.

In addition to these impurities, for example, Si, Al, Ga, In, Li, Mg, Mn, Ni, Cr, Cu, Ti, Zr, Ge, Sn, V, Nb, Ta, Sb, As, W, Mo, etc. may be contained in the form of oxides, in approximate amounts of up to 1% by weight of silicon oxide, up to 5% by weight of aluminum oxide, up to 5% by weight of gallium oxide, up to 3% by weight of indium oxide, up to 1% by weight of lithium oxide, up to 3% by weight of magnesium oxide, up to 3% by weight of manganese oxide, up to 3% by weight of nickel oxide, up to 3% by weight of chromium oxide, up to 3% by weight of copper oxide, up to 3% by weight of titanium oxide, up to 3% by weight of zirconium oxide, up to 3% by weight of germanium oxide, up to 3% by weight of tin oxide, up to 3% by weight of vanadium oxide, up to 3% by weight of niobium oxide, up to 3% by weight of tantalum oxide, up to 3% by weight of antimony oxide, up to 3% by weight of arsenic oxide, up to 3% by weight of tungsten oxide, and up to 3% by weight of molybdenum oxide.

Further, the ferrite particles of the invention are comprised of the above-described oxide magnetic material. When the oxide magnetic material is represented by formula (I):

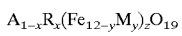

$A_{1-x}R_x(Fe_{12-y}M_y)_zO_{19}$ wherein x, y and z are molar numbers, it satisfies the range:
 $0.04 \leq x \leq 0.9$, especially $0.04 \leq x \leq 0.6$,
 $0.04 \leq y \leq 0.5$,
 $0.8 \leq x/y \leq 20$, especially $0.8 \leq x/y \leq 5$, and
 $0.7 \leq z \leq 1.2$.
The more preferred range is
 $0.04 \leq x \leq 0.5$,
 $0.04 \leq y \leq 0.5$,
 $0.8 \leq x/y \leq 5$, and
 $0.7 \leq z \leq 1.2$.
The further preferred range is
 $0.1 \leq x \leq 0.4$,
 $0.1 \leq y \leq 0.4$,
 $0.8 \leq x/y \leq 5$, and
 $0.8 \leq z \leq 1.1$, especially $0.9 \leq z \leq 1.05$.

In the above formula (I), when x/y is too smaller or too larger, no equilibrium is established between the valence of element R and the valence of element M, and a hetero phase is likely to form. Since element M is divalent, x/y is ideally equal to 1 when element R is a tetravalent ion. The reason why a wide permissible range is afforded in the region where x/y is in excess of 1 is that equilibrium in valence is reached by the reduction of $Fe^{3+} \rightarrow Fe$ even when y is small. Otherwise, the reasons of limitation of x, y and z are the same as previously mentioned. Further, if x/y is somewhat greater than 1, there is obtained an additional effect that magnetic properties (HcJ) become stable to the calcining atmosphere (oxygen partial pressure).

The ferrite particles of the invention comprising the oxide magnetic material provide a higher coercivity than the prior art even when the mean particle diameter of primary particles is more than 1 $\mu$m. The mean particle diameter of primary particles is preferably up to 2 $\mu$m, more preferably up to 1 $\mu$m, and most preferably 0.1 to 1 $\mu$m. A too large mean particle diameter indicates that the magnet powder has a higher proportion of multi-domain particles and hence, lower HcJ. A too small mean particle diameter would detract from the magnetism due to thermal disturbance and adversely affect orientation during compacting in a magnetic field and compactability.

In a further embodiment, the invention provides ferrite particles comprising A, R, Fe, and M wherein A is at least one element selected from the group consisting of strontium, barium, calcium and lead, with strontium being essentially contained in A, R is at least one element selected from the group consisting of bismuth and rare earth elements inclusive of yttrium, with lanthanum being essentially contained in R, and M is cobalt or cobalt and zinc, said ferrite particles having an intrinsic coercivity (HcJ) and a temperature dependency of coercivity (Oe/° C.) which satisfy the formula (III):

$$\text{HcJ} \leq 5/3 \times \text{HcJ} - 7/3$$

wherein ΔHcJ represents the magnitude or absolute value of the temperature dependency (Oe/° C.) of intrinsic coercivity (HcJ) between −50° C. and 50° C., and the unit of HcJ is expressed in kOe. Ferrite particles having such properties can be obtained using the oxide magnetic material of the above-defined composition or by a preparation method to be described later.

Ferrite particles are generally used in forming bonded magnets by bonding the particles with a binder. As the binder, NBR rubber, chlorinated polyethylene, nylon 12 (polyamide resin) and nylon 6 (polyamide resin) are usually used.

The oxide magnetic material of the above-defined composition usually has a Curie temperature of 425 to 460° C.

For the preparation of ferrite particles, there are available various methods including a solid phase reaction method, liquid phase method such as co-precipitation and hydrothermal synthesis, glass precipitation method, atomizing pyrolysis method, and gas phase method. Of these methods, the solid phase reaction method is most widely employed in the industry as the method for preparing ferrite particles for bonded magnets. Ferrite particles for use in coating type magnetic recording media are mainly prepared by the liquid phase method or glass precipitation method.

In the solid phase reaction method, ferrite particles are prepared by using an iron oxide powder and powders containing elements A, R and M, and firing (or calcining) a mixture of these powders. In the calcined body, primary particles of ferrite agglomerate and assume a so-called "granular" state. Therefor, the calcining is often followed by pulverization. Pulverization may be either dry or wet. Since strains are then induced in the ferrite particles to detract from magnetic properties (mainly HcJ), the pulverization is often followed by annealing.

Furthermore, when rubber magnets in sheet form are produced, ferrite particles must be oriented by mechanical stresses. In this regard, to provide a high degree of orientation, the shape of ferrite particles should preferably be tabular.

When ferrite particles are prepared by the solid phase reaction method, the following points are important.

(1) To prevent agglomeration of ferrite particles.
(2) To remove strains from ferrite particles.
(3) Ferrite particles are tabular when they are mechanically oriented.
(4) The size of ferrite particles falls in an appropriate range.

To achieve these points, there may be used a method of adding barium or strontium chloride to a mixture of an iron oxide powder, a powder containing element A, a powder containing element R and a powder containing element M, firing (or calcining) the resulting mixture, and thereafter, washing off the chloride added. An alternative method involves pulverizing an ordinarily calcined body, adding barium or strontium chloride thereto, firing (or calcining) the mixture again, and thereafter, washing off the chloride (see JP-B 19046/1980).

In addition to the above-described raw material powders, there may be contained $B_2O_3$ and other compounds, for example, compounds of ,Si, Al, Ga, In, Li, Mg, Mn, Ni, Cr, Cu, Ti, Zr, Ge, Sn, V, Nb, Ta, Sb, As, W, Mo, etc. as additives or incidental impurities, if desired.

Calcination may be performed in air, for example, at 1,000 to 1,350° C. for about 1 second to about 10 hours, especially about 1 second to about 3 hours.

The thus calcined body has a ferrite structure of substantially the magnetoplumbite type and its primary particles preferably have a mean particle diameter of up to 2 μm, more preferably up to 1 μm, further preferably 0.1 to 1 μm, most preferably 0.1 to 0.5 μm. The mean particle diameter may be measured by means of a scanning electron microscope.

Next, the calcined body is usually pulverized or disintegrated into a powder of ferrite particles. The ferrite particles are mixed with various binders such as resins, metals and rubber and molded in the presence or absence of a magnetic field. Thereafter, the molded part is optionally cured, obtaining a bonded magnet.

Alternatively, a coating type magnetic recording medium is obtained by mixing the ferrite particles with a binder to form a coating composition, applying the coating composition to a substrate of resin or the like, and optionally curing the coating to form a magnetic layer.

The present invention further provides a sintered magnet comprising the above-described oxide magnetic material wherein when the compositional ratio of the oxide magnetic material is represented by formula (II):

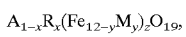

$$A_{1-x}R_x(Fe_{12-y}M_y)_zO_{19},$$

it satisfies the range:
  $0.04 \leq x \leq 0.9$,
  $0.04 \leq y \leq 0.5$,
  $0.4 \leq x/y \leq 4$, especially $0.8 \leq x/y \leq 4$, and
  $0.7 \leq z \leq 1.2$.

The more preferred range is:
  $0.04 \leq x \leq 0.9$,
  $0.04 \leq y \leq 0.5$,
  $0.8 \leq x/y \leq 2$, and
  $0.7 \leq z \leq 1.2$.

The most preferred range is:
  $0.04 \leq x \leq 0.5$,
  $0.04 \leq y \leq 0.5$,
  $0.8 \leq x/y \leq 2$, especially $0.8 \leq x/y \leq 1.7$, and
  $0.7 \leq z \leq 1.2$.

The definition of A, R, M, x, y and z in formula (II) and the reasons of limitation thereof are the same as previously described for formula (I). The reason of limitation of x/y is also the same as previously described for formula (I). The impurities which may be contained in addition to these elements are the same as previously described for the oxide magnetic material. Further, if x/y is somewhat greater than 1, there is obtained an additional effect that magnetic properties (HcJ) become stable to the firing atmosphere (oxygen partial pressure).

The sintered magnet is prepared by compacting the ferrite particles which have been prepared by the various methods described above as the ferrite particle preparing method and firing the compact. Although the use of ferrite particles prepared by the solid phase reaction method is most widely employed in the industry as the method for preparing sintered magnets, ferrite particles prepared by other methods may also be used. The origin of ferrite particles is not critical.

Since the calcined mass is usually granular, it is preferred to first carry out dry coarse comminution in order to pulverize or disintegrate the calcined mass. The dry coarse comminution is also effective for introducing crystal strains into the ferrite particles to reduce their coercivity HcB. Reduction of coercivity restrains agglomeration of particles so that the dispersibility is improved. Restraining agglomeration of particles also improves the degree of orientation. The crystal strains introduced into the particles are relieved in the subsequent sintering step whereby the coercivity is resumed, obtaining a permanent magnet. It is noted that upon dry coarse comminution, $SiO_2$ and $CaCO_3$ which converts into CaO upon firing are usually added. Parts of $SiO_2$ and $CaCO_3$ may be added prior to calcination. The majority of impurities and Si and Ca added segregate at grain boundaries and triple point sites while some are taken in the ferrite portion (primary phase) within particles. In particular, calcium is likely to occupy strontium sites.

Subsequent to the dry coarse comminution, it is preferable to prepare a pulverizing slurry containing ferrite particles and water and subject the slurry to wet pulverization.

Subsequent to the wet pulverization, the pulverizing slurry is concentrated into a molding slurry. Concentration may be done by centrifugation or using a filter press.

Molding may be either dry or wet although wet molding is preferable for increasing the degree of orientation.

In the wet molding step, the molding slurry is molded in a magnetic field. The molding pressure is about 0.1 to about 0.5 ton/cm$^2$, and the magnetic field applied is about 5 to about 15 kOe.

For the wet molding, either a non-aqueous dispersing medium or an aqueous dispersing medium may be used. When the non-aqueous dispersing medium is used, it is obtained by adding a surfactant such as oleic acid to an organic solvent such as toluene or xylene as described, for example, in JP-A 3064/1994. The use of such a dispersing medium enables to ccomplish a high degree of magnetic orientation of about 98% at maximum even when ferrite particles of submicron size which are otherwise difficult to disperse are used. On the other hand, the aqueous dispersing medium used herein may be obtained by adding various surfactants to water.

Subsequent to the molding step, the compact is heat treated in air or nitrogen at a temperature of 100 to 500° C. for thoroughly decomposing off the dispersant added. In the next sintering step, the compact is sintered, for example, in air at a temperature of 1,150 to 1,270° C., more preferably 1,160 to 1,240° C. for about 0.5 to about 3 hours, obtaining an anisotropic ferrite sintered magnet.

The sintered magnet of the invention preferably has a mean crystal grain diameter of up to 2 μm more preferably up to 1 μm, further preferably 0.5 to 1.0 μm. The sintered magnet of the invention exhibits a fully high coercivity even when the mean crystal grain diameter is in excess of 1 μm. The crystal grain diameter can be measured by means of a scanning electron microscope. The resistivity is about $10^0$ Ωm or higher.

It is noted that the sintered magnet may also be obtained by disintegrating the compact by means of a crusher or the like, classifying the fragments through a sieve to collect a fraction of magnetic field orientable granules having a mean particle diameter of about 100 to 700 μm, and dry molding the granules in a magnetic field, followed by sintering.

In the invention, a magnetic recording medium having a thin film magnetic layer is encompassed. Like the above-described ferrite particles of the invention, this thin film magnetic layer contains the oxide magnetic material having a hexagonal ferrite phase represented by the above formula (I). The contents of impurities are the same as in the above-described oxide magnetic material.

For forming the thin film magnetic layer, it is usually preferred to use sputtering. For sputtering, the sintered magnet described above may be used as a target. Multi-target sputtering using two or more oxide targets is also acceptable. After the formation of the sputtered film, it is sometimes heat treated to establish a hexagonal magnetoplumbite structure.

When the oxide magnetic material of the invention is applied, the following advantages are generally obtained so that excellent applied products are obtainable. More particularly, provided that applied products are of the same shape as conventional ferrite products, the magnets, which generate a more magnetic flux density, contribute to improvements in the performance of products, for example, the achievement of higher torque in the case of motors, and the achievement of sound quality with improved linearity due to the strengthened magnetic circuit in the case of speakers or headphones. Also, if applied products may have the same function as the prior art products, the dimensions (thickness) of magnets can be reduced (thinner), contributing to size and weight reductions (flattening). Also, in the case of motors using wound electromagnets as the field magnet, the ferrite magnets can substitute for the electromagnets, contributing to weight reduction, manufacturing process shortening and cost reduction. Because of the improved temperature properties of coercivity (HcJ), it becomes possible to use the ferrite magnets in low-temperature environments where conventional ferrite magnets have the risk of low-temperature demagnetization (permanent demagnetization). The reliability of products used in cold districts and high altitude zones is significantly improved.

The bonded magnets and sintered magnets prepared using the oxide magnetic materials of the invention will find a wide variety of applications as described below after they are worked to the desired shape.

The magnets are advantageously used in automotive motors for fuel pumps, power windows, ABS, fans, wipers, power steering, active suspensions, starters, door locks and mirrors; motors for business machines and audio-visual equipment such as FDD spindles, VCR capstans, VCR rotary heads, VCR reels, VCR loading, VCR camera capstans, VCR camera rotary heads, VCR camera zoom, VCR camera focus, tape cassette capstans, CD, LD, and MD drive spindles, CD, LD and MD loading, CD and LD optical pickups; motors for household appliances such as air conditioner compressors, refrigerator compressors, electric tools, fans, microwave oven fans, microwave oven plate rotation, mixer driving, dryer fans, shaver driving, and power toothbrushes; motors for factory automation equipment such as robot shafts, connection drives, robot drives, machine tool table drives, and machine tool belt drives; and miscellaneous units including motorcycle generators, speaker magnets, headphone magnets, magnetron tubes, MRI magnetic field generating systems, CD- ROM clamps, distributor sensors, ABS sensors, fuel/oil level sensors, and magnet latches.

EXAMPLE

Example 1
(Sintered magnet: Comparison in A—R—Fe—M composition)

The raw materials used herein are as follows.

$Fe_2O_3$ powder (primary particle diameter 0.3 μm, containing Mn, Cr, Si and Cl as impurities)

SrCO$_3$ powder (primary particle diameter 2 μm, containing Ba and Ca as impurities)

a mixture of Co$_3$O$_4$ and CoO powders (primary particle diameter 1–5 μm)

La$_2$O$_3$ powder (purity 99.9%)

These raw materials were blended so as to give the predetermined composition. Furthermore, SiO$_2$ powder (primary particle diameter 0.01 μm) and CaCO$_3$ powder (primary particle diameter 1 μm) were added to the raw materials in amounts of 0.2% and 0.15% by weight of the raw materials, respectively. The resulting mixture was comminuted in a wet attritor for 2 hours, dried, sieved, and calcined in air at 1,200° C. for 3 hours, obtaining a granular calcined mass (magnet powder).

To the calcined mass obtained by calcining at 1,200° C. were added 0.4% by weight of the above-described SiO$_2$ and 1.25% by weight of the above-described CaCO$_3$. This was comminuted in a dry rod mill until a specific surface area of 7 m$^2$/g was reached.

Next, using xylene as a non-aqueous solvent and oleic acid as a surfactant, the calcined mass powder was wet comminuted in a ball mill. The amount of oleic acid added was 1.3% by weight of the calcined powder. The concentration of the calcined mass powder in the slurry was 33% by weight. Comminution was continued until a specific surface area of 8 to 9 m$^2$/g was reached.

The foregoing comminution steps introduced comminution strains into the calcined powder so that the HcJ of the calcined powder was reduced to 15 to 60% of the HcJ prior to comminution. From the comminution machines, some Fe and Cr were introduced.

The comminuted slurry was processed by a centrifugal separator so as to adjust the concentration of the calcined powder in the slurry to about 85% by weight. While the solvent was removed from the slurry, the slurry was compacted into a cylindrical shape having a diameter of 30 mm and a height of 15 mm in a magnetic field of about 13 kG applied in a longitudinal direction. The compacting pressure was 0.4 ton/cm$^2$. A part of the slurry was dried and fired at 1,000° C. so that all the ingredients were converted into oxides before the amounts of the ingredients were determined by fluorescent x-ray quantitative analysis. The results are shown in Table 1.

TABLE 1

Results of fluorescent x-ray quantitative analysis

| Sample No. | Composition (at %) | | | | | | | | |
|---|---|---|---|---|---|---|---|---|---|
| | Fe | Sr | Ba | Ca | La | Co | Mn | Si | Cr |
| 11 | 88.0 | 5.1 | 0.0 | 1.1 | 2.2 | 2.2 | 0.3 | 0.6 | 0.1 |
| 12 | 88.3 | 5.2 | 0.0 | 1.1 | 2.0 | 2.2 | 0.4 | 0.7 | 0.2 |
| 13 | 87.9 | 5.2 | 0.0 | 1.1 | 2.3 | 2.2 | 0.3 | 0.7 | 0.1 |
| 14 | 88.1 | 4.4 | 0.0 | 1.1 | 2.9 | 2.2 | 0.3 | 0.7 | 0.2 |
| 15* | 88.1 | 7.2 | 0.1 | 1.1 | 0.0 | 2.3 | 0.3 | 0.7 | 0.1 |
| 16* | 88.6 | 0.0 | 0.0 | 1.0 | 7.0 | 2.0 | 0.3 | 0.6 | 0.4 |
| 17* | 90.1 | 5.4 | 0.0 | 1.1 | 2.3 | 0.0 | 0.3 | 0.7 | 0.1 |

*comparison

Next, the compact was heat treated at 100 to 300° C. to thoroughly remove the oleic acid, and then sintered by heating in air at a heating rate of 5° C./min. and holding at 1,200° C. for 1 hour, obtaining a sintered product. The sintered product was worked at its upper and lower surfaces before it was examined for 4πIs, remanence (Br), coercivity (HcJ), Ir/Is, Hk/HcJ, maximum energy product ((BH)max), and 'sintered density. The results are shown in Table 2.

TABLE 2

Properties of sintered product

| Sample No. | 4πIs (kG) | Br (kG) | HcJ (kOe) | Ir/Is (%) | Hk/HcJ (%) | (BH)max (MGOe) | Sintered density (g/cm$^3$) |
|---|---|---|---|---|---|---|---|
| 11 | 4.50 | 4.39 | 4.55 | 97.6 | 83.1 | 4.7 | 5.04 |
| 12 | 4.53 | 4.41 | 4.59 | 97.4 | 77.6 | 4.8 | 5.03 |
| 13 | 4.59 | 4.48 | 4.38 | 97.7 | 83.5 | 4.9 | 5.06 |
| 14 | 4.50 | 4.42 | 4.72 | 98.3 | 84.1 | 4.8 | 5.03 |
| 15* | 4.43 | 4.06 | 1.42 | 91.6 | 3.3 | 1.2 | 4.92 |
| 16* | 0.96 | 0.68 | 1.73 | 71.5 | 12.7 | 0.1 | 4.91 |
| 17* | 4.32 | 4.20 | 2.89 | 97.3 | 97.2 | 4.3 | 4.97 |

*comparison

As is evident from Table 2, sintered cores within the scope of the invention, designated sample Nos. 11 to 14, exhibit excellent properties.

Example 2

(Sintered magnet: Comparison in R-M substitution)

The raw materials used herein are as follows.

Fe$_2$O$_3$ powder (primary particle diameter 0.3 μm, containing Mn, Cr, Si and Cl as impurities)

SrCO$_3$ powder (primary particle diameter 2 μm, containing Ba and Ca as impurities) a mixture of Co$_3$O$_4$ and CoO powders (primary particle diameter 1–5 μm)

La$_2$O$_3$ powder (purity 99.9%)

These raw materials were blended so as to give the composition: Sr$_{1-x}$La$_x$Fe$_{12-y}$Co$_y$O$_{19}$. Furthermore, SiO$_2$ powder (primary particle diameter 0.01 μm) and CaCO$_3$ powder (primary particle diameter 1 μm) were added to the raw materials in amounts of 0.2% and 0.15% by weight of the raw materials, respectively. The resulting mixture was comminuted in a wet attritor for 2 hours, dried, sieved, and calcined in air at 1,150 to 1,300° C. for 3 hours, obtaining a calcined mass. By subsequently following the same procedure as in Example 1, a sintered product was prepared.

The sintered product was worked at its upper and lower surfaces before the relationship of remanence (Br), coercivity (HcJ and HcB), and maximum energy product ((BH) max) to the substitution rates x and y of La and Co (with the proviso: x=y) was examined. The results are shown in FIGS. 1 and 2 along with the sintering temperature.

Figure 2:
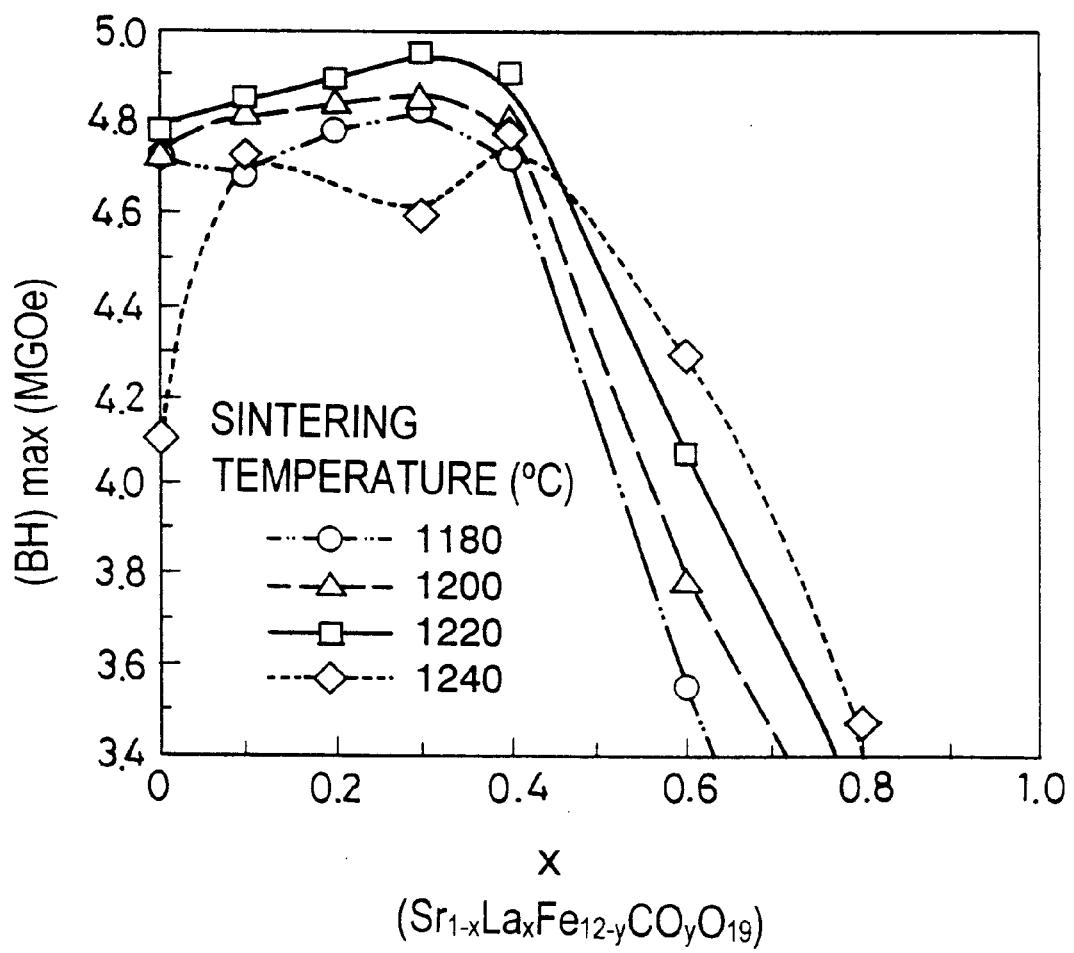
FIG. 2 is a graph showing the magnetic characteristic of strontium ferrite sintered bodies versus the substitution (x, y) of La and Co.
Figure 3:
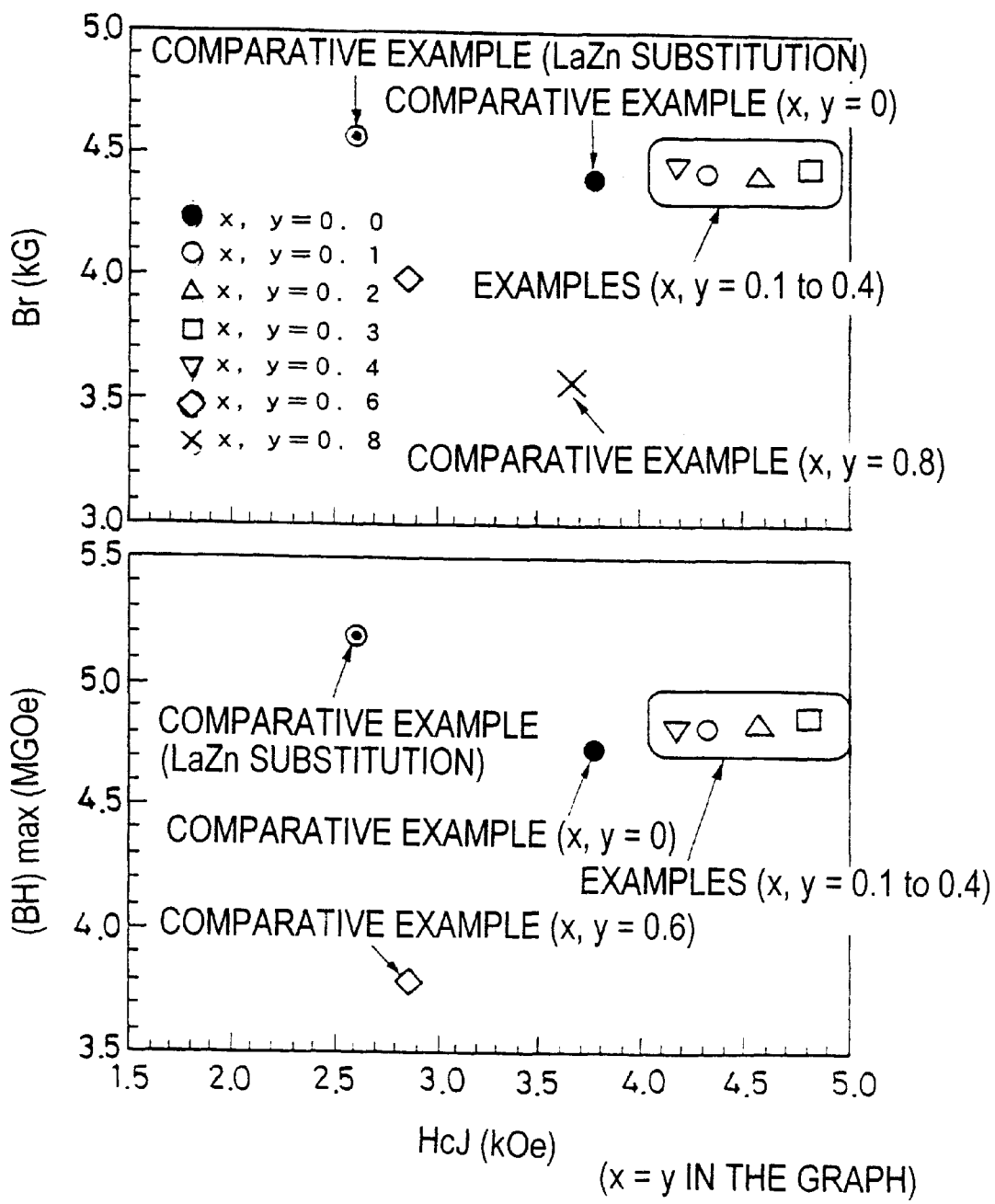
FIG. 3 is a graph showing the magnetic characteristics of strontium ferrite sintered bodies versus the substitution (x, y) of La and Co.

It is seen from FIGS. 1 and 2 that when x and y are within the scope of the invention, a significant improvement in HcJ or HcB can be achieved by optimizing the sintering temperature, while maintaining high magnetic properties of Br≧4.4 kG and (BH)max≧4.6 MGOe. To definitely demonstrate this fact, for those sintered products wherein both the calcining and sintering temperatures were 1,200° C., FIG. 3 shows the relationship of Br to HcJ and the relationship of (BH)max to HcJ found when x varies. For comparison purposes, the data of the sintered product described in Japanese Patent Application No. 145006/1996, labeled "Comparative Example (LaZn substitution)," are also shown in FIG. 3. The sintered product of this Comparative Example has a primary phase represented by $$Sr_{0.7}La_{0.3}Fe_{11.7}Zn_{0.3}O_9$$

The sintered products of Examples (wherein x is from 0.1 to 0.4) shown in FIG. 3 had a HcJ of at least 4 kOe and Br which satisfied the formula (IV):

$$Br+\frac{1}{3}HcJ \geq 5.75.$$

In contrast, the sintered products of Comparative Examples shown in FIG. 3 had a HcJ of less than 4 kOe and Br which did not satisfy the formula (V):

$$Br+\frac{1}{10}HcJ \geq 4.82.$$

Figure 4:
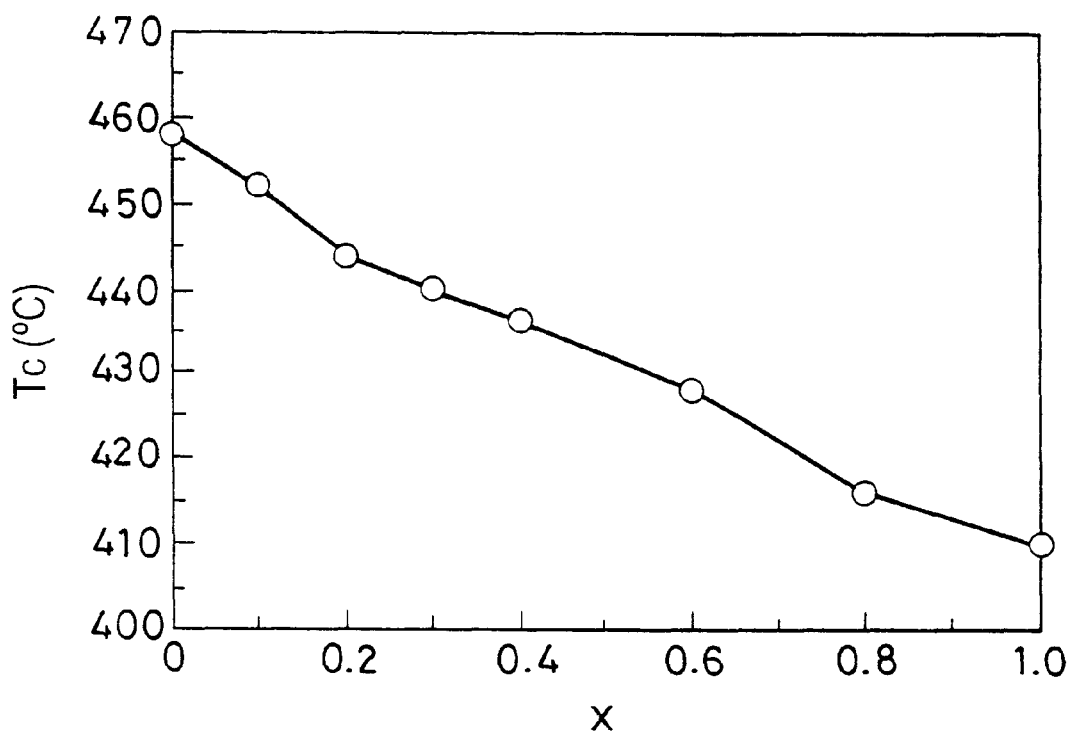
FIG. 4 is a graph showing the Curie temperature (Tc) of strontium ferrite sintered bodies versus the substitution (x, y) of La and Co.

For those sintered products wherein the sintering temperature was 1,220° C., FIG. 4 shows the relationship of the Curie temperature (Tc) to substitution rates x and y (with the proviso: x=y). It is seen from FIG. 4 that Tc lowers as x and y increase.

Example 3
(Sintered magnet: Comparison in calcining temperature and sintering temperature)

Figure 5:
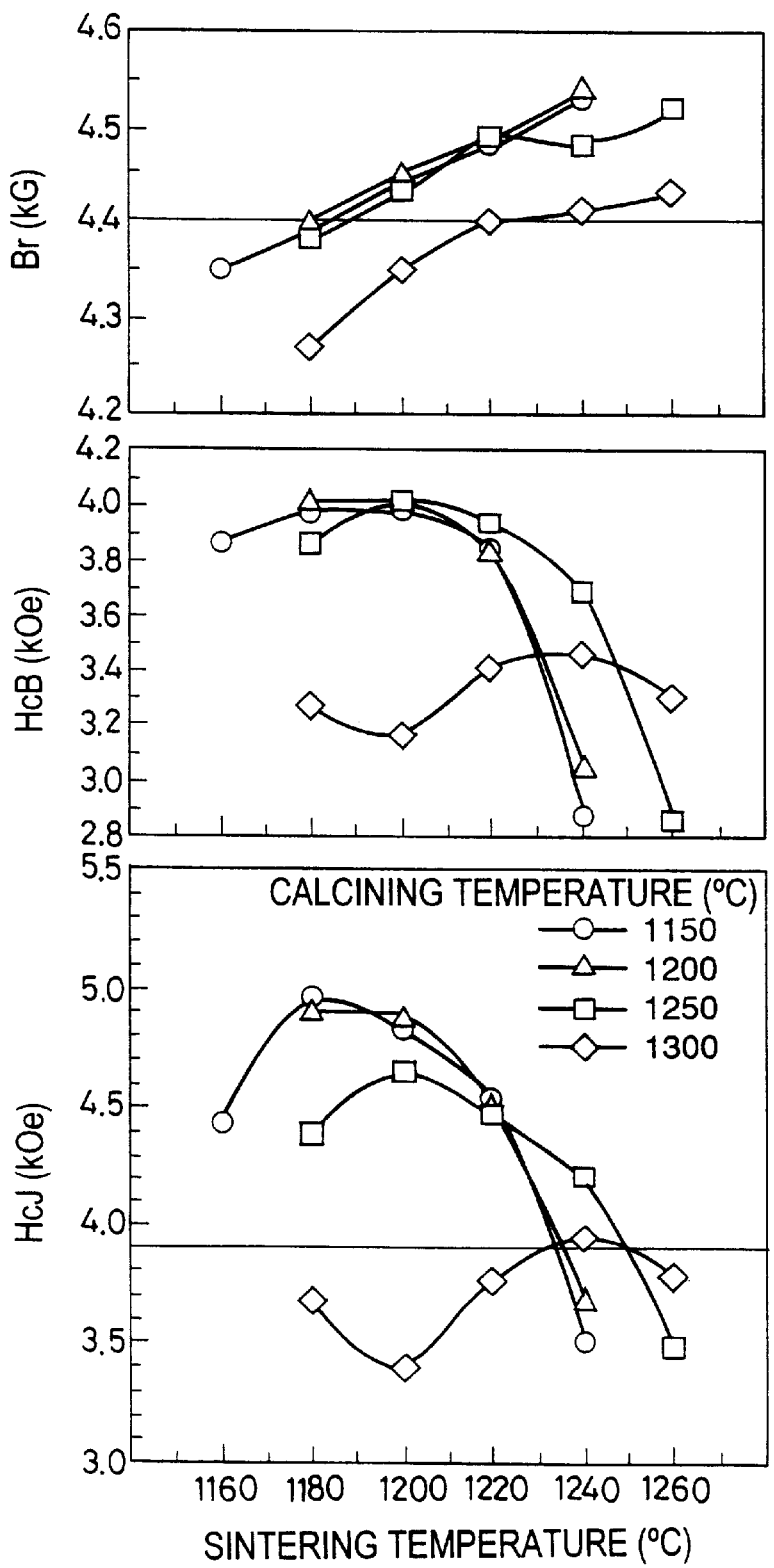
FIG. 5 is a graph showing the magnetic characteristics of strontium ferrite sintered bodies versus the calcining and sintering temperatures.

Sintered products were prepared as in Example 1 except that the raw materials were blended so as to give the composition:

$$Sr_{1-x}La_xFe_{12-y}Co_yO_{19}$$

wherein x=0.3 and y=0.3, and the calcining temperature and the sintering temperature were changed as shown in FIG. 5. It is seen from FIG. 5 that in order to provide high Br and high HcJ, a calcining temperature of lower than 1,300° C. and a sintering temperature of 1,180 to 1,220° C. are preferable. It is noted that even when calcination was done at 1,300° C., a sintering temperature of 1,240° C. resulted in high magnetic properties including Br 4.4 kG and HcJ 4.0 kOe.

Figure 6:
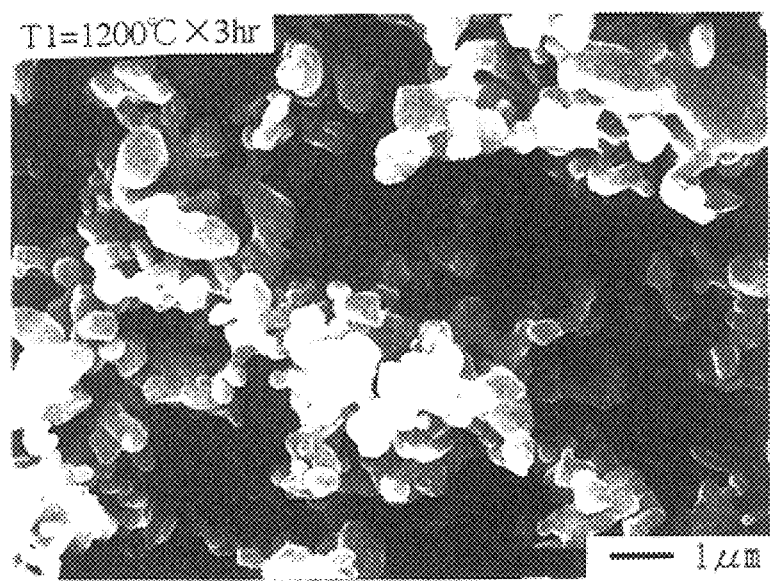
FIG. 6 is a figure-substituting photograph illustrating a grain structure and is an SEM photomicrograph of a strontium ferrite calcined body.
Figure 7:
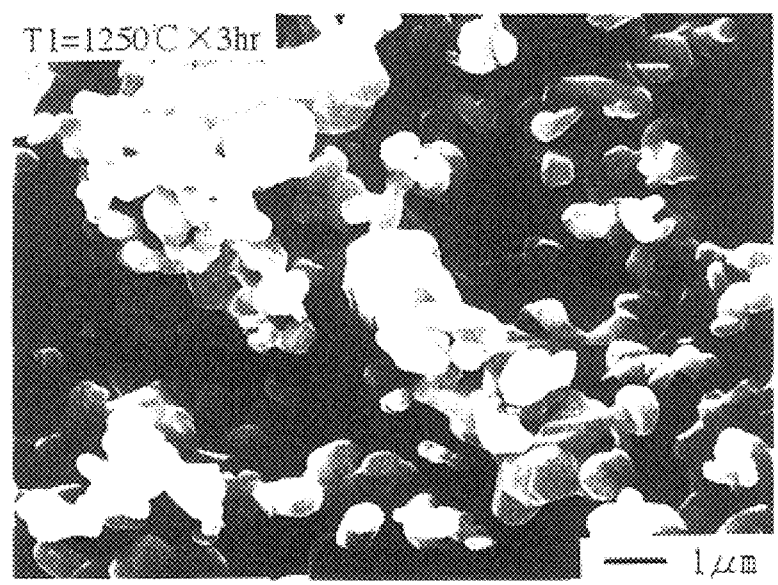
FIG. 7 is a figure-substituting photograph illustrating a grain structure and is an SEM photomicrograph of a strontium ferrite calcined body.
Figure 8:
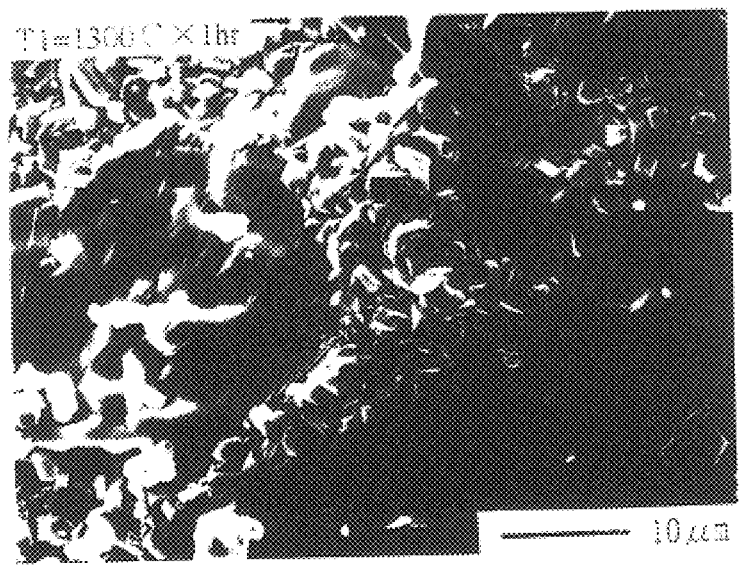
FIG. 8 is a figure-substituting photograph illustrating a grain structure and is an SEM photomicrograph of a strontium ferrite calcined body.

To analyze this characteristic phenomenon, the calcined products and sintered products were examined for texture structure by means of a scanning electron microscope (SEM). FIGS. 6, 7 and 8 are SEM photomicrographs of calcined products obtained at a calcining temperature (T1) of 1,200° C., 1,250° C. and 1,300° C., respectively. It is seen that in the calcined product obtained at a calcining temperature of 1,300° C., coarse grains having a grain diameter in excess of 10 μm are the majority.

The texture structure of sintered products was also examined by means of SEM. SEM photomicrographs are shown in FIGS. 9 to 12. The calcining temperature (T1) and sintering temperature (T2) used are as follows.

Figure 9:
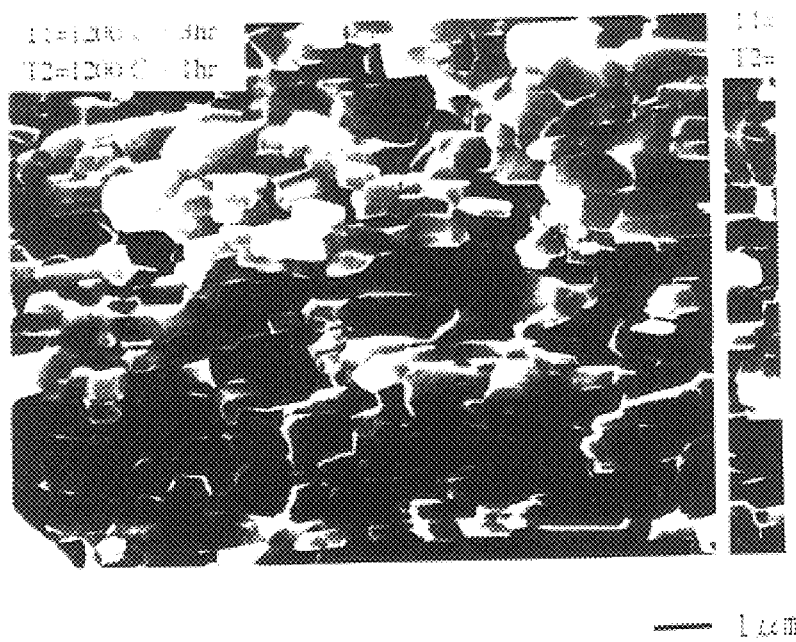
FIG. 9 is a figure-substituting photograph illustrating a grain structure and is an SEM photomicrograph of a cross section (parallel to the a face of crystals) of a strontium ferrite sintered body.
Figure 10:
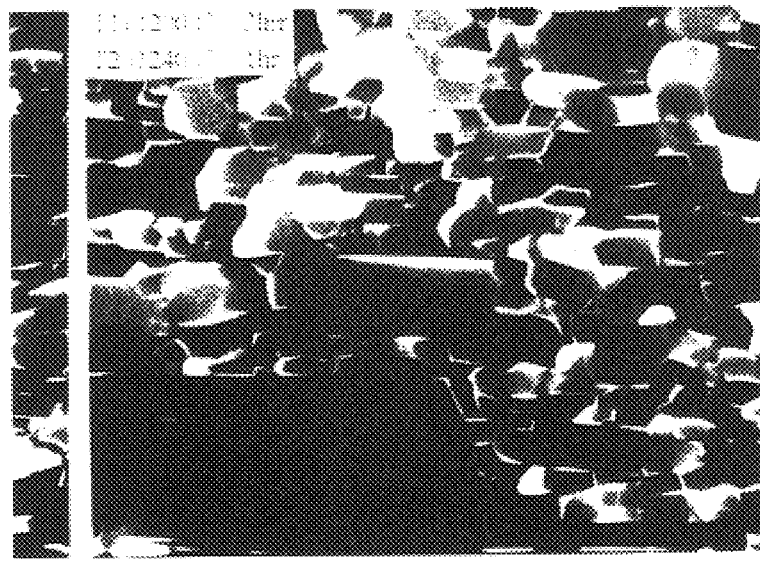
FIG. 10 is a figure-substituting photograph illustrating a grain structure and is an SEM photomicrograph of a cross section (parallel to the a face of crystals) of a strontium ferrite sintered body.
Figure 11:
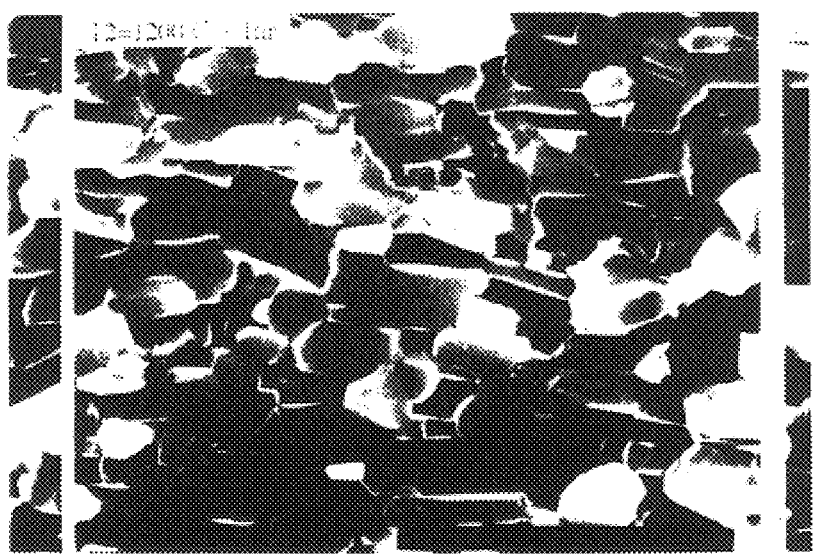
FIG. 11 is a figure-substituting photograph illustrating a grain structure and is an SEM photomicrograph of a cross section (parallel to the a face of crystals) of a strontium ferrite sintered body.
Figure 12:
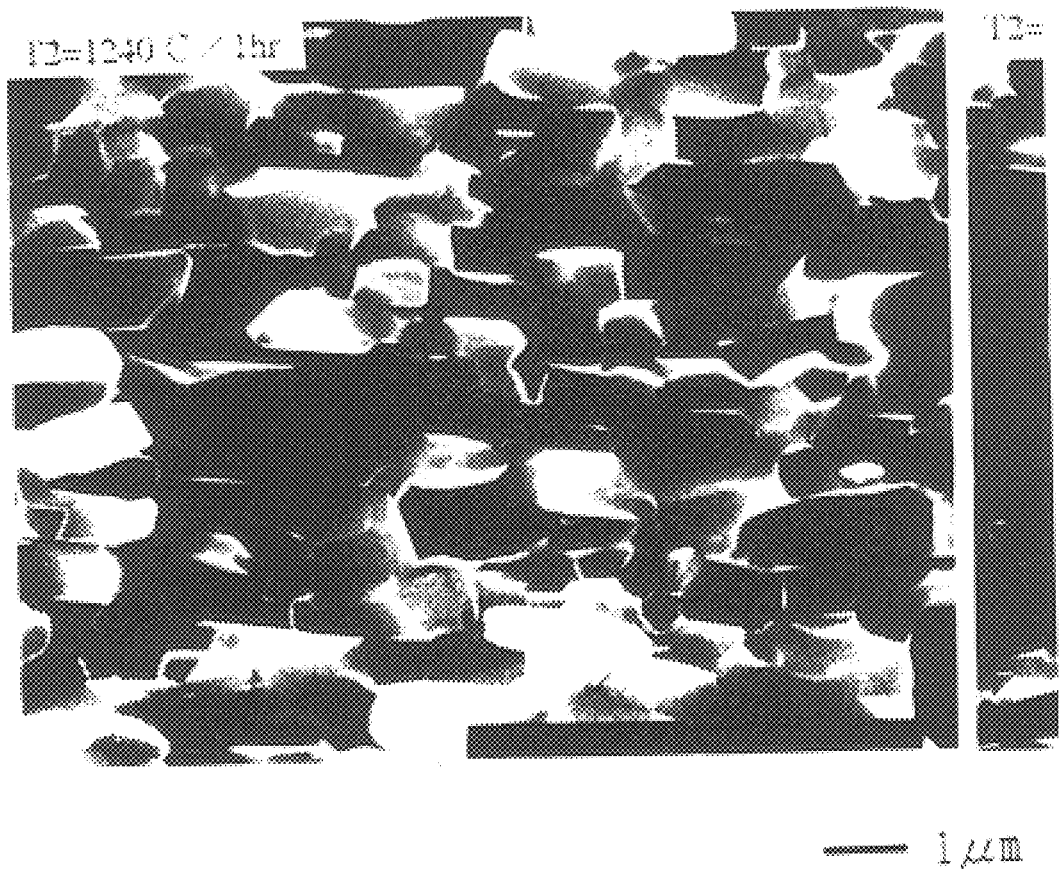
FIG. 12 is a figure-substituting photograph illustrating a grain structure and is an SEM photomicrograph of a cross section (parallel to the a face of crystals) of a strontium ferrite sintered body.

FIG. 9: T1=1200° C., T2=1200° C.
FIG. 10: T1=1200° C., T2=1240° C.
FIG. 11: T1=1300° C., T2=1200° C.
FIG. 12: T1=1300° C., T2=1240° C.

These photographs show cross sections parallel to the face of crystals. It is seen that even in the sintered products having HcJ 4.5 kOe or higher, relatively many crystal grains having a grain diameter in excess of 1 lm are present. It is also seen that in the sintered products obtained at a calcining temperature of 1,300° C., most crystal grains have a grain diameter in excess of 1 gm. Nevertheless, a HcJ as high as about 4 kOe at maximum is obtained despite such a large crystal grain diameter, which indicates that the present invention is effective for improving the dependency of magnetic properties, especially HcJ, on crystal grain diameter.

The calcined product (x=0.3, y=0.3) had a mean primary particle diameter of up to 1 μm when the calcining temperature was up to 1,250° C., whereas the sintered product obtained by sintering the calcined product at a temperature of up to 1,220° C. had a mean crystal grain diameter of up to 1.5 Mm. In contrast, the calcined product had a mean primary particle diameter of at least 3 Hm when the calcining temperature was 1,300° C., whereas the sintered product obtained by comminuting the calcined product, molding and sintering at a temperature of up to 1,220° C. had a mean crystal grain diameter of up to 3 μm.

Example 4
(Sintered maanet: Comoarison between Sr ferrite magnets and Ba ferrite magnets)

Calcined masses were prepared as in Example 1 except that the raw materials were blended so as to give the composition:

$$Sr_{1-x}La_xFe_{12-y}Co_yO_{19}$$

wherein x=y was equal to 0.2 or 0.3. The calcining temperature was 1,200° C. The calcined products were fired, obtaining strontium ferrite sintered magnets. The sintering temperature was selected from the range of 1,180 to 1,260° C.

For comparison purposes, barium ferrite sintered magnets were prepared by blending the raw materials so as Go give the primary phase composition:

$$Ba_{1-x}La_xFe_{12-y}Co_yO_{19}$$

wherein x=y was equal to 0.2 or 0.3, setting the calcining temperature at 1,200° C., and selecting the sintering temperature from the range of 1,180 to 1,260° C. like the strontium ferrite magnets. The texture structures of the sintered products were observed by means of a scanning electron microscope (SEM), finding that grains of the bariumn ferrite had a greater aspect ratio and were flattened. Among the barium ferrite magnets thus obtained, Table 3 shows the HcJ of the magnets wherein x=0.3 and y=0.3 and the ratio of shrinkage factors in the a-axis (diameter) direction and the c-axis (height) direction and the sintered density of the magnets wherein the sintering temperature is 1,220° C. There is a general tendency that grains become flattened when the ratio of shrinkage factors (Shh/Shφ) is high. The anisotropy field ($H_A$) of the barium ferrite wherein x=0.3 was 16.6 kOe when measured by the method of Example 7.

TABLE 3

HcJ when x = 0.3 and y = 0.3, ratio of shrinkage factors in c-axis (h) direction and a-axis (φ) direction and sintered density

| Composition | HcJ max (kOe) | Shh/Shφ [1220° C.] | Sintered density (g/cm³) |
|---|---|---|---|
| Sr | 4.93 (1180° C.) | 1.89 | 5.06 |
| Ba | 3.51 (1180° C.) | 2.65 | 5.13 |

Figure 13:
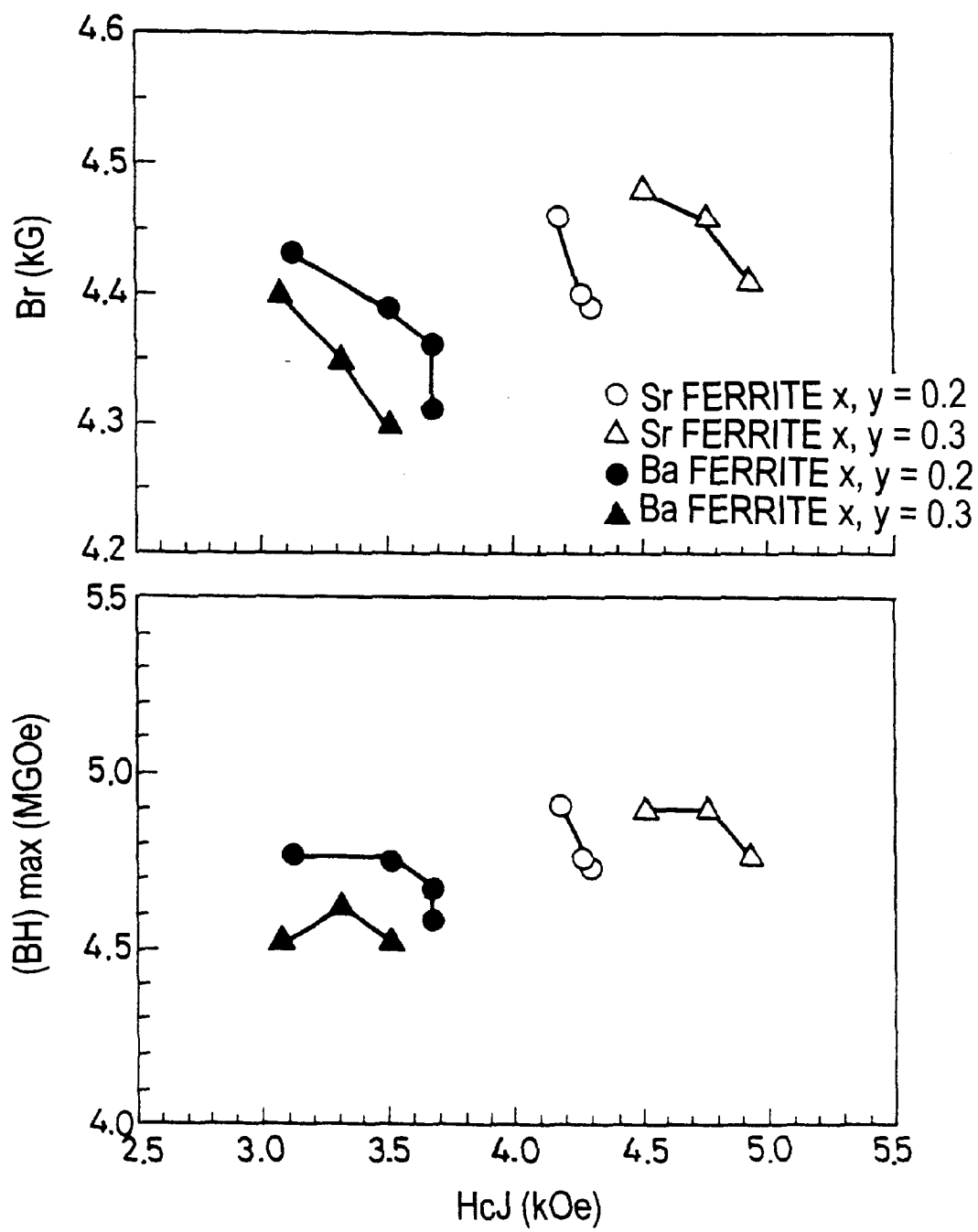
FIG. 13 is a graph showing (BH)max and Br versus HcJ of strontium ferrite sintered bodies and barium ferrite sintered bodies.

FIG. 13 shows the magnetic properties of these sintered products. In FIG. 13, the magnetic properties of a plurality of sintered products of the same composition, but at different sintering temperatures are shown. It is seen that in the case of barium ferrite, great HcJ is not obtainable due to the low anisotropy field ($H_A$) and the ease of grain flattening. In fact, as shown in FIG. 13, HcJ is about 3.5 kOe at maximum, which value is approximate to the values available in conventional strontium ferrite magnets.

In FIG. 13, strontium ferrite sintered products (all having HcJ of at least 4 kOe) have Br and HcJ which satisfy the above formula (IV). In contrast, barium ferrite sintered products (all having HcJ of less than 4 kOe) have Br and HcJ which do not satisfy the above formula (V).

Example 5

(Ferrite particles: temperature properties of HcJ)

Figure 14:
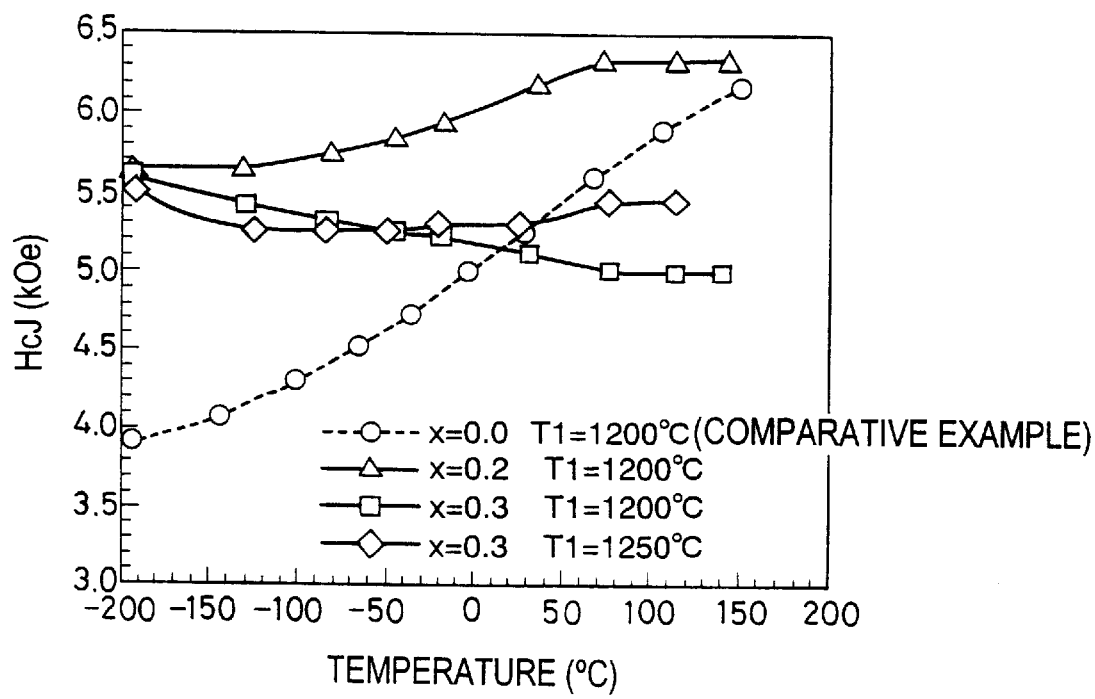
FIG. 14 is a graph showing the temperature dependency of HcJ of strontium ferrite calcined bodies.

For strontium ferrite calcined masses whose composition and calcining temperature are shown in Table 4, I-H hysteresis curves were measured by means of VSM over the temperature range shown in FIG. 14. From these I-H hysteresis curves, the temperature dependency of HcJ was determined. FIG. 14 shows curves representing the temperature dependency of HcJ. Based on these results, a temperature coefficient of HcJ over the range from −50° C. to +50° C. was computed by linear approximation. The temperature coefficient and the correlation coefficient over the range from −50° C. to +50° C. are also shown in Table 4. Note that the temperature coefficient $\Delta HcJ/HcJ/\Delta T$ in Table 4 is a percent change of HcJ at 25° C.

TABLE 4

Temperature properties of HcJ versus substitution (x, y) of LaCo-substituted Sr ferrite calcined products $(Sr_{1-x}La_xFe_{12-y}CO_yO_{19})$ (between −50° C. and +50° C.)

| Calcined sample No. | x, y | Calcining temp. (° C.) | HcJ [25° C.] (kOe) | $\Delta HcJ/\Delta T$ (Oe/° C.) | $\Delta HcJ/HcJ/\Delta T$ (%/° C.) | Correlation coefficient |
|---|---|---|---|---|---|---|
| 101* | 0 | 1200 | 5.24 | 8.0 | 0.15 | 0.999 |
| 102 | 0.2 | 1200 | 6.15 | 4.0 | 0.07 | 0.995 |
| 103 | 0.3 | 1200 | 5.14 | −1.7 | −0.03 | 0.994 |
| 104 | 0.3 | 1250 | 5.35 | 1.2 | 0.02 | 0.939 |

*comparison

It is evident from Table 4 that the temperature coefficient of HcJ of strontium ferrite calcined products is significantly reduced by the combined addition of lanthanum and cobalt.

Example 6

(Sintered magnet: temperature properties of HcJ and Br)

Figure 15:
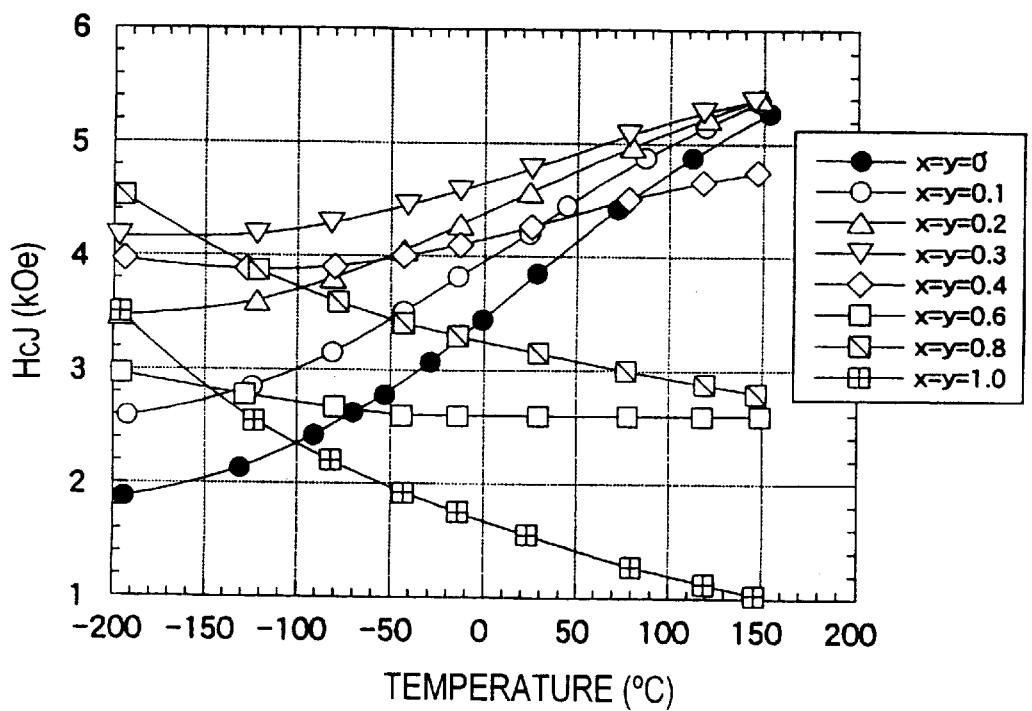
FIG. 15 is a graph showing the temperature dependency of HcJ of strontium ferrite sintered bodies.

Strontium ferrite sintered products having a phase composition wherein x=y was from 0 to 1 and z=1 were prepared. The calcining and sintering temperatures were both 1,200° C. These sintered products were worked into a cylindrical shape having a diameter of 5 mm and a height of 6.5 mm (the height direction aligned with c axis) and examined for the temperature dependency of HcJ as in Example 5. The results are shown in FIG. 15 and Table 5. Br and HcJ at 25° C. and Br and HcJ at −25° C. are also shown in Table 5.

TABLE 5

Temperature properties of HcJ and Br versus substitution (x, y) of LaCo-substituted Sr ferrite sintered products $(Sr_{1-x}La_xFe_{12-y}Co_yO_{19})$ (between −50° C. and +50° C.)

| Sintered sample No. | x, y | Br [25° C.] (kG) | Br [−25° C.] (kG) | HcJ [25° C.] (kOe) | HcJ [−25° C.] (kOe) | $\Delta HcJ/\Delta T$ (Oe/° C.) | $\Delta HcJ/HcJ/\Delta T$ (%/° C.) | Correlation coefficient |
|---|---|---|---|---|---|---|---|---|
| 201* | 0 | 4.40 | 4.83 | 3.80 | 3.17 | 12.5 | 0.33 | 0.999 |
| 202 | 0.3 | 4.40 | 4.85 | 5.01 | 4.76 | 5.1 | 0.10 | 0.997 |

It is seen from Table 5 that the temperature properties of HcJ of strontium ferrite sintered products are significantly improved by the combined addition of lanthanum and cobalt.

With respect to the magnetic properties at 25° C., the sintered product with x=0.3 and y=0.3 (HcJ higher than 4 kOe) gives:

$$Br + \tfrac{1}{3}HcJ = 6.07$$

and thus satisfies the above formula (IV), whereas the sintered product with x=0 and y=0 (HcJ less than 4 kOe) gives:

$$Br + \tfrac{1}{10}HcJ = 4.78$$

and thus does not satisfy the above formula (V). With respect to the magnetic properties at −25° C., the sintered product with x=0.3 gives:

$$Br + \tfrac{1}{3}HcJ = 6.44$$

and thus satisfies the above formula (VI), whereas the sintered product with x=0 and y=0 merely gives:

$$Br + \tfrac{1}{3}HcJ = 5.89$$

and thus does not satisfy the above formula (VI).

Example 7

(Sintered magnet: anisotropy field)

Figure 16:
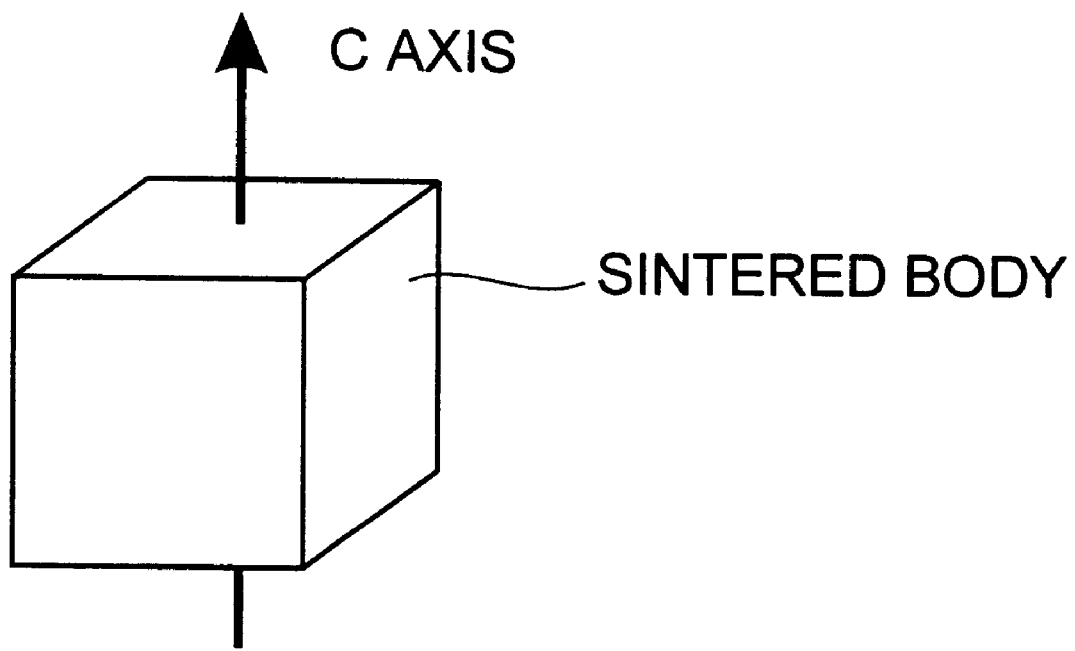
FIG. 16 is a perspective view of a cubic strontium ferrite sintered body used in the measurement of anisotropy field $(H_A)$, showing the direction of a crystal axis.

Sintered products were prepared as in Example 1 except that the raw materials were blended so as to give the composition:

$$Sr_{1-x}La_xFe_{12-y}Co_yO_{19}$$

wherein x and y (x=y) were as shown in Table 6. From these sintered products, cubes with each side of 12 mm were cut out. As shown in FIG. 16, one side surface of the cube is perpendicular to the c axis. In the a and c axis directions of the cubes, the first quadrants of $4\pi Is$-H curves were measured, and the anisotropy field ($H_A$) was determined from their intersection. The results are shown in Table 6. The saturation magnetization $4\pi Is$ and density of each cube are also shown in Table 6.

TABLE 6

Anisotropy field ($H_A$) versus substitution (x, y) of LaCo-
substituted Sr ferrite sintered products ($Sr_{1-x}La_xFe_{12-y}Co_yO_{19}$)
(calcining temperature 1200° C. and sintering temperature 1240° C.)

| x, y | $H_A$ (kOe) | $4\pi Is$ (kG) | Density (g/cm³) |
|---|---|---|---|
| 0.0 | 18.5 | 4.56 | 5.00 |
| 0.1 | 19.0 | 4.59 | 5.02 |
| 0.2 | 19.3 | 4.58 | 5.05 |
| 0.3 | 20.3 | 4.64 | 5.07 |
| 0.4 | 19.8 | 4.62 | 5.09 |
| 0.6 | 18.8 | 4.43 | 4.92 |

It is evident from Table 6 that both $4\pi Is$ and H. increase when x ranges from 0.1 to 0.4 and y ranges from 0.1 to 0.4 within the scope of the invention. Also in this range, $K_1(=(H_A \cdot Is)/2)$ increases.

Example 8

(Sintered magnet, ferrite particles: La≠Co)

Figure 17:
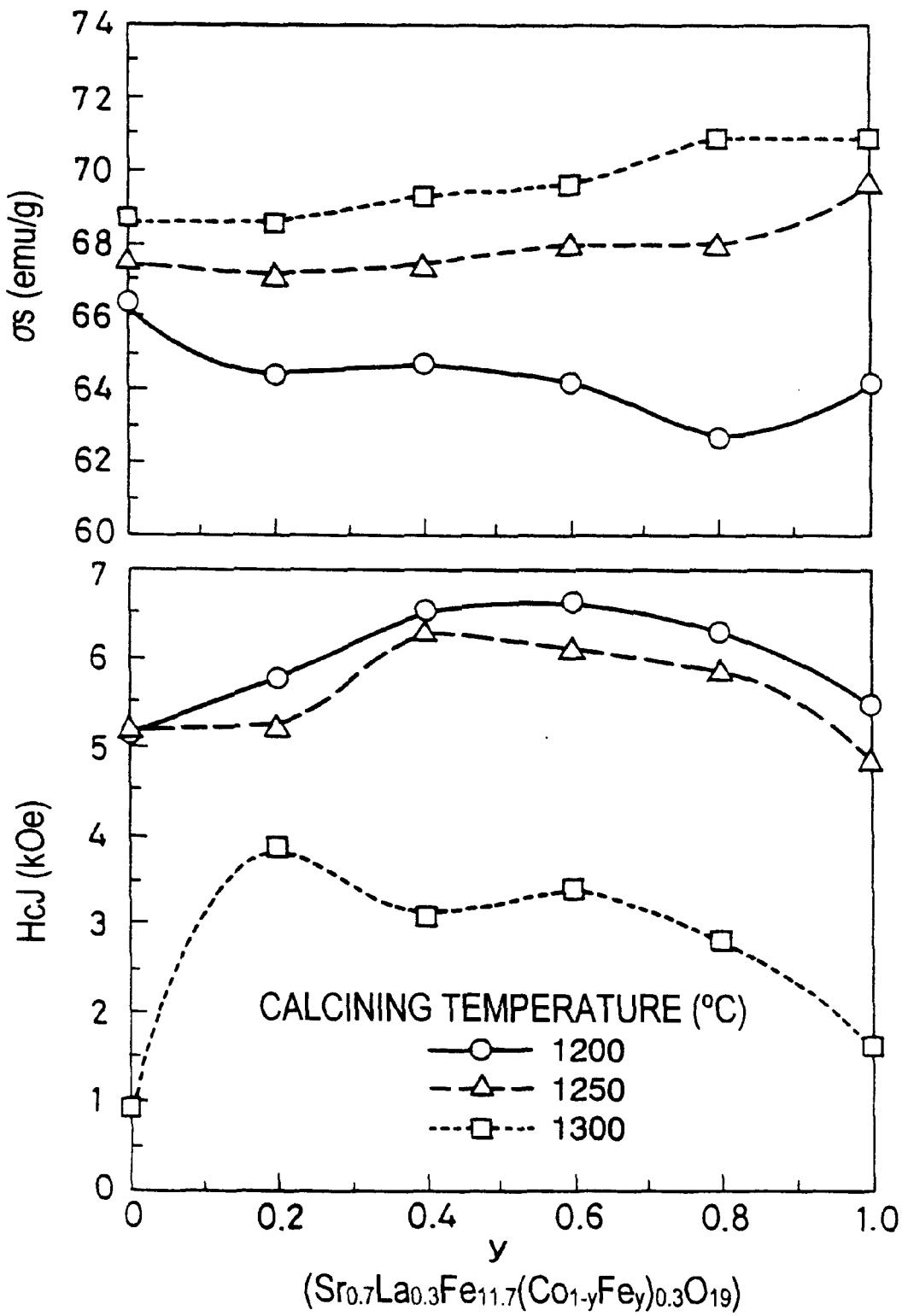
FIG. 17 is a graph showing how the magnetic properties of strontium ferrite calcined bodies are affected by the substitution of Co relative to the substitution of La.
Figure 18:
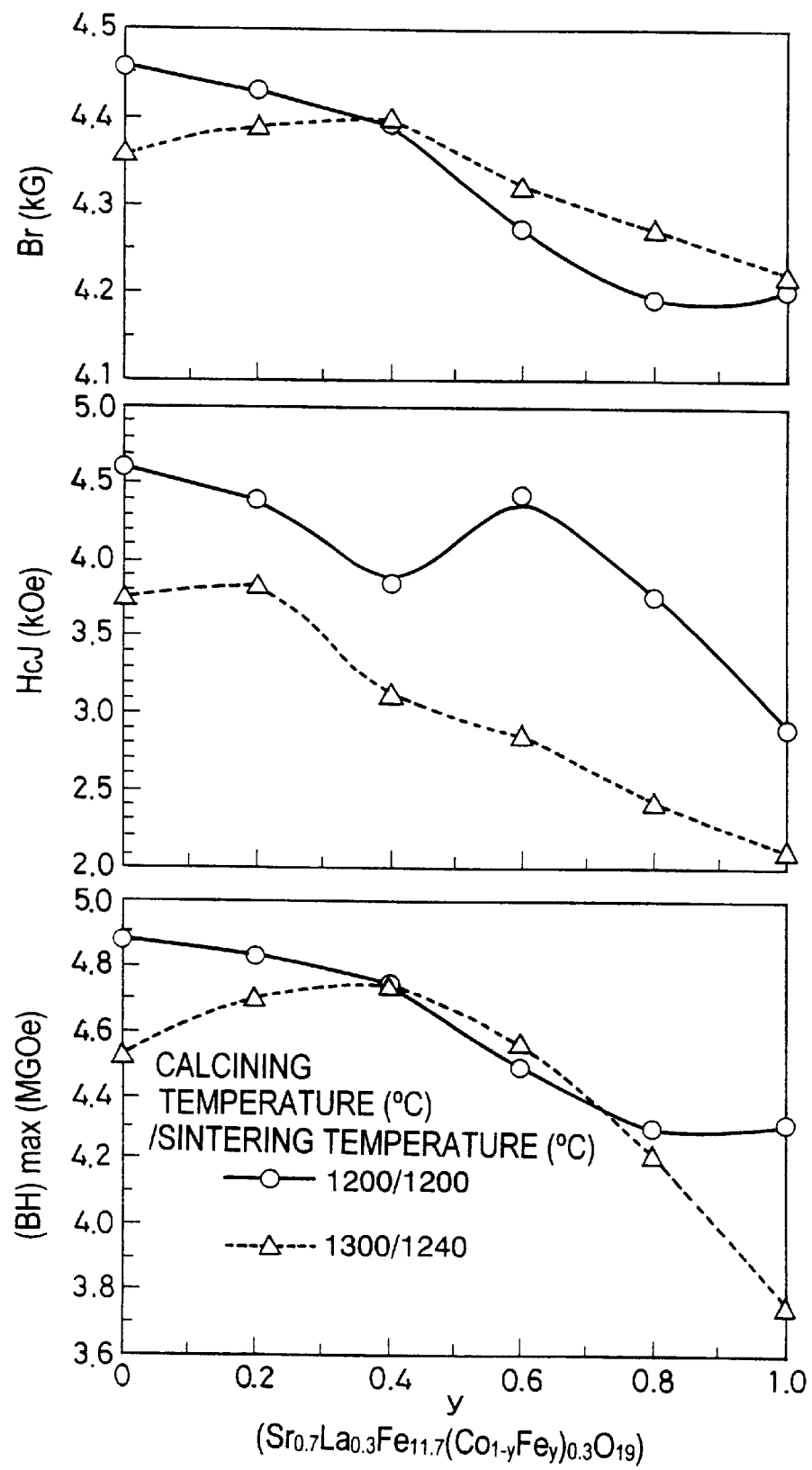
FIG. 18 is a graph showing how the magnetic properties of strontium ferrite sintered bodies are affected by the substitution of Co relative to the substitution of La.

Calcined products and sintered products were prepared as in Example 1 except that the raw materials were blended so as to give the composition:

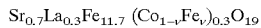

which corresponds to $Sr_{1-x}La_xFe_{12-y}Co_yO_{19}$ wherein y=0.3 (1-v) and v=1-y/0.3. FIG. 17 shows how the magnetic properties of calcined products vary with v and also with the calcining temperature. FIG. 18 shows how the magnetic properties of sintered products vary with v and also with the calcining and sintering temperatures.

It is seen from FIG. 17 that when calcination was performed at 1,200° C. and when calcination was performed at 1,250° C., ferrite particles having a high HcJ of at least 6 kOe (6.6 kOe at maximum) which was never achieved in the prior art were obtained.

However, it is noted that in the range of v>0.8 for $Sr_{0.7}La_{0.3}Fe_{11.7}$ $(Co_{1-v}Fe_v)_{0.3}O_{19}$/ that is, in the range of La/Co=x/y>5 for $Sr_{1-x}La_xFe_{12-y}Co_yO_{19}$, the degradation of magnetic properties becomes noticeable.

Further, it is seen from FIG. 18 that in the range of v>0.5 for $Sr_{0.7}La_{0.3}Fe_{11.7}$ $(Co_{1-v}Fe_v)0.3O_{19}$, that is, in the range of La/Co=x/y>2 for $Sr_{1-x}La_xFe_{12-y}Co_yO_{19}$, the degradation of magnetic properties becomes noticeable.

Example 9

(Sintered maanet: Co+Zn added)

Calcined products and sintered products were prepared as in Example 1 except that the raw materials were blended so as to give the composition:

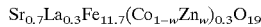

Figure 19:
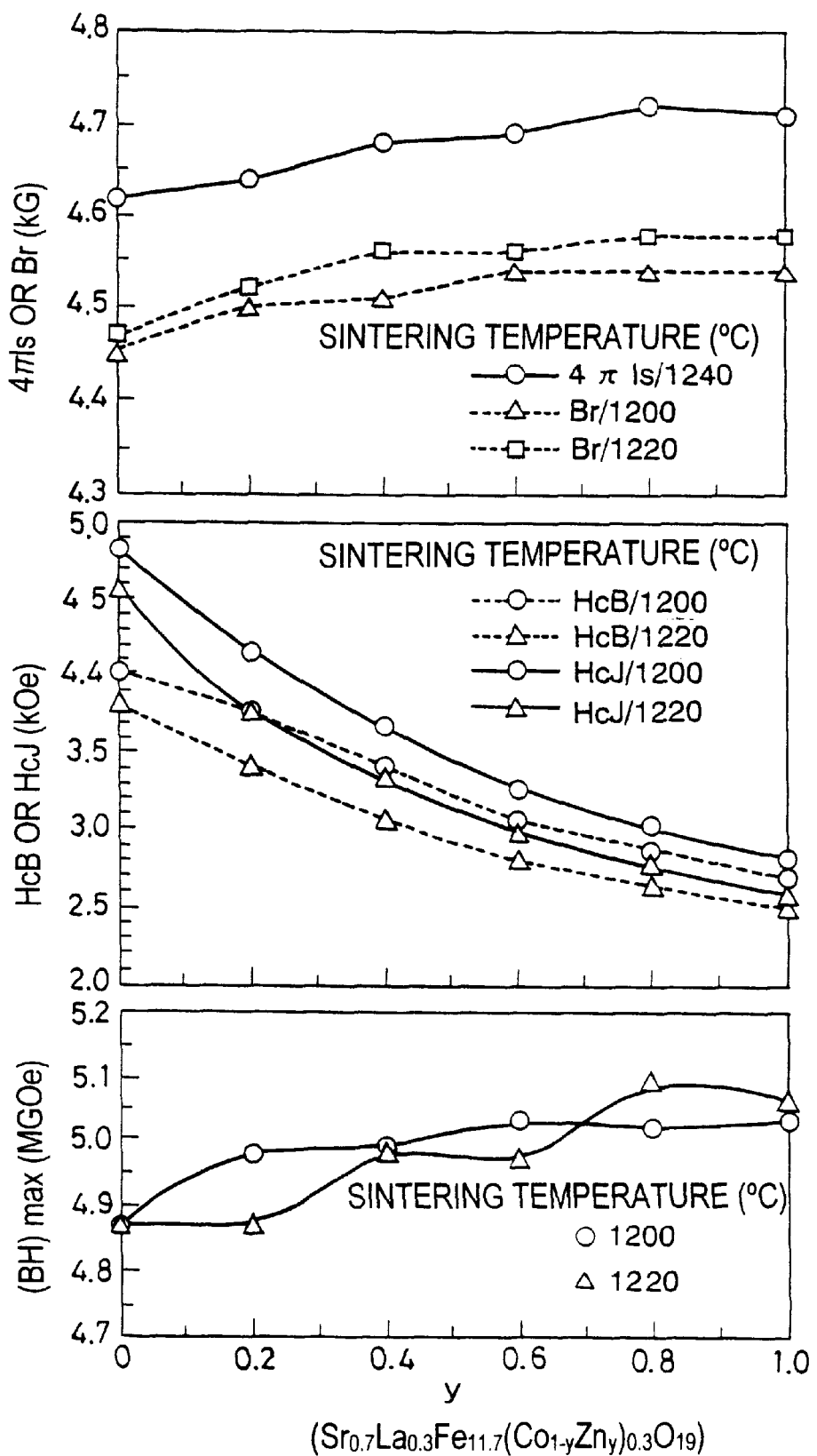
FIG. 19 is a graph showing how the magnetic properties of strontium ferrite sintered bodies are affected by the substitution of Co relative to the substitution of Zn.

FIG. 19 shows how the magnetic properties of sintered products at a calcining temperature of 1,200° C. vary with w and also with the sintering temperature.

It is seen from FIG. 19 that either $4\pi Is$ or HcJ can be selectively improved by altering the ratio of cobalt to zinc. It is also seen that properties can be continuously changed between the high saturation magnetization type and the high coercivity type.

Example 10

(Sintered maanet)

Sintered products were prepared as in Example 1 except that the raw materials were blended so as to give the composition:

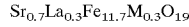

wherein M=Zn, Mg, Mn, Ni, Co or Li +Fe, the calcining temperature was 1,200° C. and the sintering temperature was 1,220° C. These sintered products were measured for magnetic properties and density. The results are shown in Table 7.

TABLE 7

Magnetic properties of $Sr_{0.7}La_{0.3}Fe_{11.7}M_{0.3}O_{19}$ sintered products

| M | Br (kG) | HcJ (kOe) | (BH)max (MGOe) | Density (g/cm³) |
|---|---|---|---|---|
| Zn | 4.61 | 2.62 | 5.14 | 5.06 |
| Mg | 4.35 | 2.45 | 4.57 | 4.99 |
| Mn | 4.11 | 3.35 | 4.15 | 5.02 |
| Ni | 4.33 | 3.11 | 4.46 | 5.02 |
| Co | 4.48 | 4.51 | 4.91 | 5.06 |
| Li + Fe | 4.14 | 2.80 | 4.19 | 4.99 |

The improvement in coercivity by the combined addition of lanthanum and cobalt is evident from Table 7. Where M is zinc, high Br and high (BH)max are obtained, but low HcJ. Where elements other than zinc are added, all the properties are inferior to the properties obtained where M is cobalt.

It was found that when a part of lanthanum was replaced by bismuth in the strontium ferrites prepared in the foregoing Examples, the calcining temperature could be lowered by the addition of bismuth. That is, the calcining temperature at which best properties were obtainable could be shifted to the lower temperature side without a substantial loss of coercivity. Also, when calcined products and sintered products of the composition wherein a part of lanthanum was replaced by another rare earth element were prepared, an improvement in HcJ by the combined addition of the rare earth element and cobalt was ascertained as in the foregoing Examples.

Further, coating type magnetic layers containing the strontium ferrite particles prepared in the foregoing Examples were formed on substrates, fabricating magnetic cards. For these magnetic cards, similar results corresponding to substitution rates x and y were obtained as in the foregoing Examples. High outputs and high S/N were obtained when substitution rates x and y were within the scope of the invention.

Moreover, thin films were formed on substrates by sputtering and heat treated to form a hexagonal magnetoplumbite type ferrite phase as in the foregoing Examples, so that the thin films served as thin film magnetic layers, fabricating magnetic recording media. For these magnetic recording media, similar results corresponding to substitution rate x were obtained as in the foregoing Examples. High outputs and high S/N were obtained when substitution rates x and y were within the scope of the invention.

Example 11

(Sintered magnet: measurement of resistivity)

Samples wherein x varies from 0 to 1 and y varies from 0 to 1 (with the proviso x=y) were fabricated as in Example 2 except that the calcining temperature was 1,200° C. and the sintering temperature was 1,180° C. The resistivity largely changed with the values of x and y. Although the reason is not well understood, one probable cause is formation of $Fe^{2+}$.

The samples obtained were measured for DC resistivity in the a and c axis directions. The results are shown in Table 8. As seen from Table 8, the resistivity is low, but within the practically acceptable range.

TABLE 8

Resistivity ($\Omega$m) of $Sr_{1-x}La_xFe_{12-y}Co_yO_{19}$

| x, y | a axis direction | c axis direction |
|---|---|---|
| 0.0 | $1.9 \times 10^3$ | $1.3 \times 10^3$ |
| 0.1 | $1.5 \times 10^3$ | $5.4 \times 10^3$ |
| 0.2 | $3.6 \times 10^2$ | $8.3 \times 10^2$ |
| 0.3 | $9.7 \times 10^1$ | $4.9 \times 10^2$ |
| 0.4 | $3.5 \times 10^0$ | $2.3 \times 10^1$ |
| 0.6 | $7.9 \times 10^3$ | $4.2 \times 10^4$ |
| 0.8 | $2.0 \times 10^3$ | $1.2 \times 10^5$ |
| 1.0 | $8.9 \times 10^2$ | $1.7 \times 10^5$ |

Example 12
(Sintered magnet: Comparison in the amount of La added at calcining temperature 1,200° C.)

Figure 20:
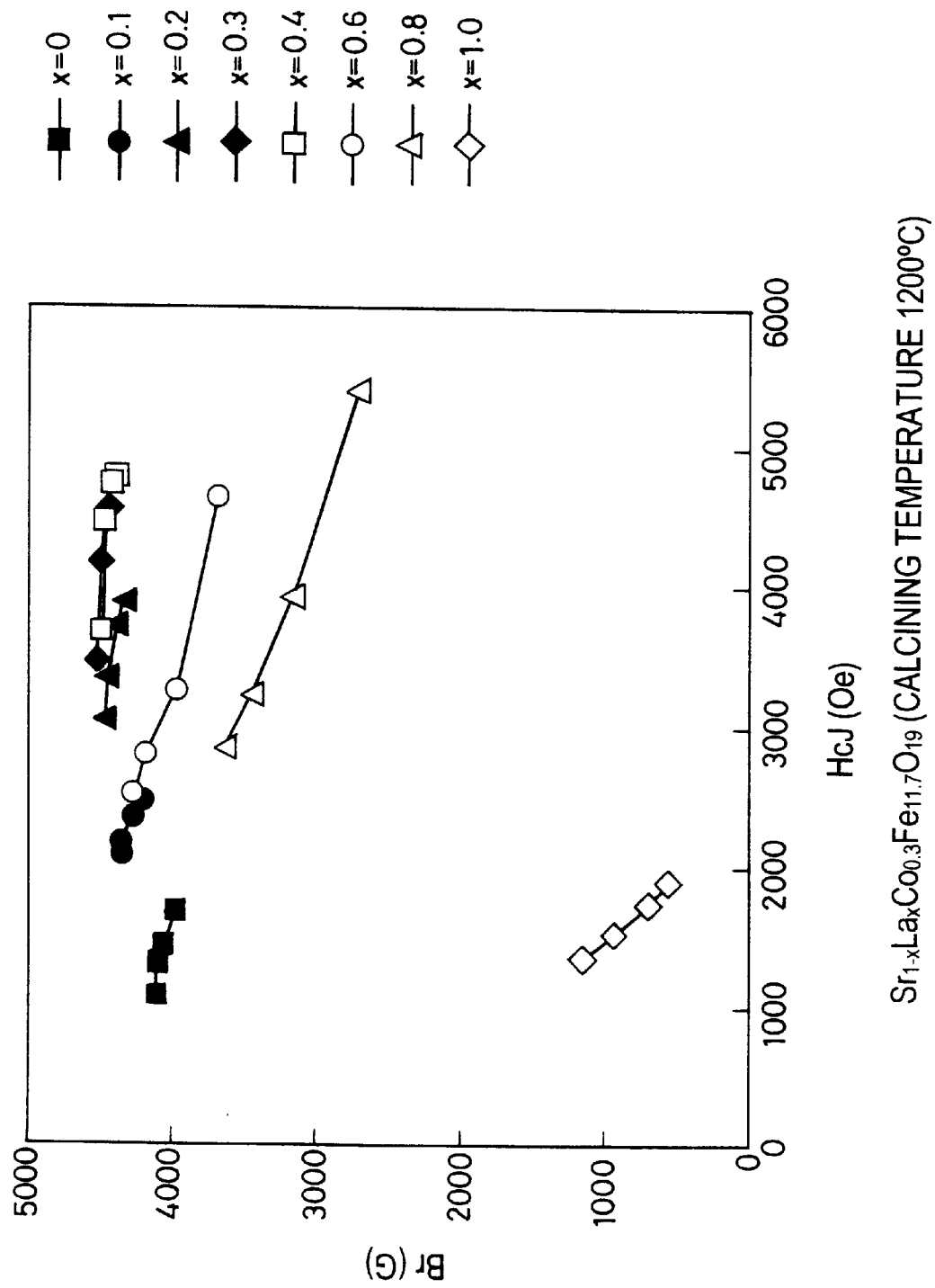
FIG. 20 is a graph comparing magnetic properties achieved with different amounts of La added, illustrating Br-HcJ curves at a calcining temperature of 1,200° C.

Sintered products were prepared as in Example 1 except that the raw materials were blended so as to give the final composition:

$$Sr_{1-x}La_xFe_{11.7}Co_{0.3}O_{19}$$

wherein x ranged from 0.0 to 1.0 and the calcining temperature was 1,200° C. They were measured for Br-HcJ properties, Ps, HcJ, Hk/HcJ, and (BH)max. The results are shown in FIGS. 20 to 22. Using a B-H tracer, an initial magnetization curve in the direction of the axis of difficult magnetization and a hysteresis curve in the direction of easy magnetization were determined on the sintered products at 1,240° C., from which the anisotropy field $H_A$ was determined. The results are shown in Table 9. The sintered products obtained by sintering in air at 1,200° C. were measured for resistivity in the c axis direction (height direction). The results are shown in Table 10. The samples wherein x was equal to 0.1 and 0.2 showed a high resistivity of greater than $10^6$, above the measurement limit of the instrument used.

TABLE 9

| x | $H_A$ (kOe) |
|---|---|
| 0.0 | 3.4 |
| 0.1 | 14.3 |
| 0.2 | 18.3 |
| 0.3 | 20.9 |
| 0.4 | 21.3 |
| 0.6 | 20.7 |
| 0.8 | 20.5 |
| 1.0 | 16.3 |

TABLE 10

Resistivity ($\Omega$m) of $Sr_{1-x}La_xFe_{11.7}CO_{0.3}O_{19}$

| x | c axis direction |
|---|---|
| 0.0 | $6.8 \times 10^2$ |
| 0.1 | $>10^6$ |
| 0.2 | $>10^6$ |

TABLE 10-continued

Resistivity ($\Omega$m) of $Sr_{1-x}La_xFe_{11.7}CO_{0.3}O_{19}$

| x | c axis direction |
|---|---|
| 0.3 | $7.6 \times 10^2$ |
| 0.4 | $3.8 \times 10^0$ |
| 0.6 | $1.1 \times 10^4$ |
| 0.8 | $2.6 \times 10^4$ |
| 1.0 | $3.8 \times 10^1$ |

It is evident from FIGS. 20 to 22 that when x was equal to 0.3 and 0.4, Br-HcJ curves became substantially an identical curve, and highest magnetic properties were obtained under such conditions. These two also had approximately equal Hk/HcJ. The saturation magnetization (es) per unit weight remained substantially unchanged when x ranged from 0 to 0.4 whereas HcJ showed a noticeably sharp decline when the amount of lanthanum or strontium became small.

In Table 9, the measurement of anisotropy field showed a monotone increase until x=0.3, reached a substantially constant value of 20 kOe when x was from 0.3 to 0.8, and declined again at x=1.0.

Example 13
(Sintered magnet: Comparison in the amount of La added at calcining temperature 1,300° C.)

Sintered products were prepared as in Example 1 except that the raw materials were blended so as to give the final composition:

$$Sr_{1-x}La_xFe_{11.7}CO_{0.3}O_{19}$$

wherein x ranged from 0.0 to 1.0 and the calcining temperature was 1,3000C. They were evaluated for-Br-HcJ properties, Hk/HcJ and Br versus HcJ, and Br and HcJ versus x. The results are shown in FIGS. 23 to 25.

Figure 23:
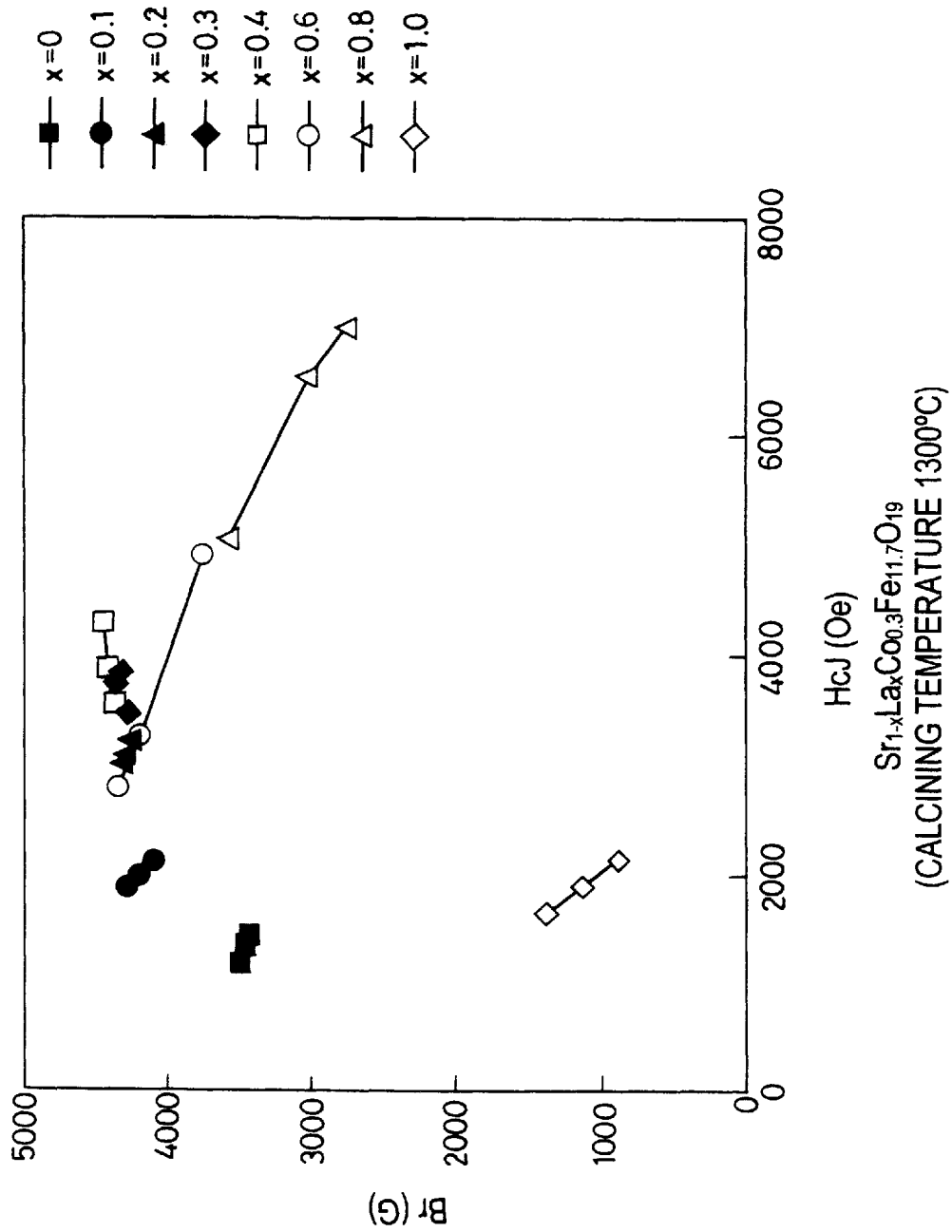
FIG. 23 is a graph comparing magnetic properties achieved with different amounts of La added, illustrating Br-HcJ curves at a calcining temperature of 1,30°0C.

It is evident form FIGS. 23 to 25 that highest magnetic properties were obtained under the condition: x=0.4 and both Br and HcJ increased with the firing temperature. However, at the firing temperature of 1,240° C. which allowed Br and HcJ to increase to substantially the same level as reached upon calcination at 1,200° C., Hk/HcJ decreased to 86.5%. In the case of calcination at 1,200° C., substantially equivalent properties were obtained between x=0.3 and x=0.4. In the case of calcination at 1,300° C., higher properties were obtained at x=0.4. Further, high HcJ values of at least 6 kOe were obtained at x=0.8.

Example 14
(Sintered magnet: Evaluation of magnetic properties in terms of x and v)

Calcined products and sintered products were prepared as in Example 1 except that the raw materials were blended so as to give the final composition:

$$Sr_{1-x}La_xFe_{12-y}Co_yO_{19}$$

wherein x and y were predetermined values and the calcining temperature was 1,250° C. They were measured for magnetic properties. The ingredients were analyzed as in Example 1.

Figure 26:
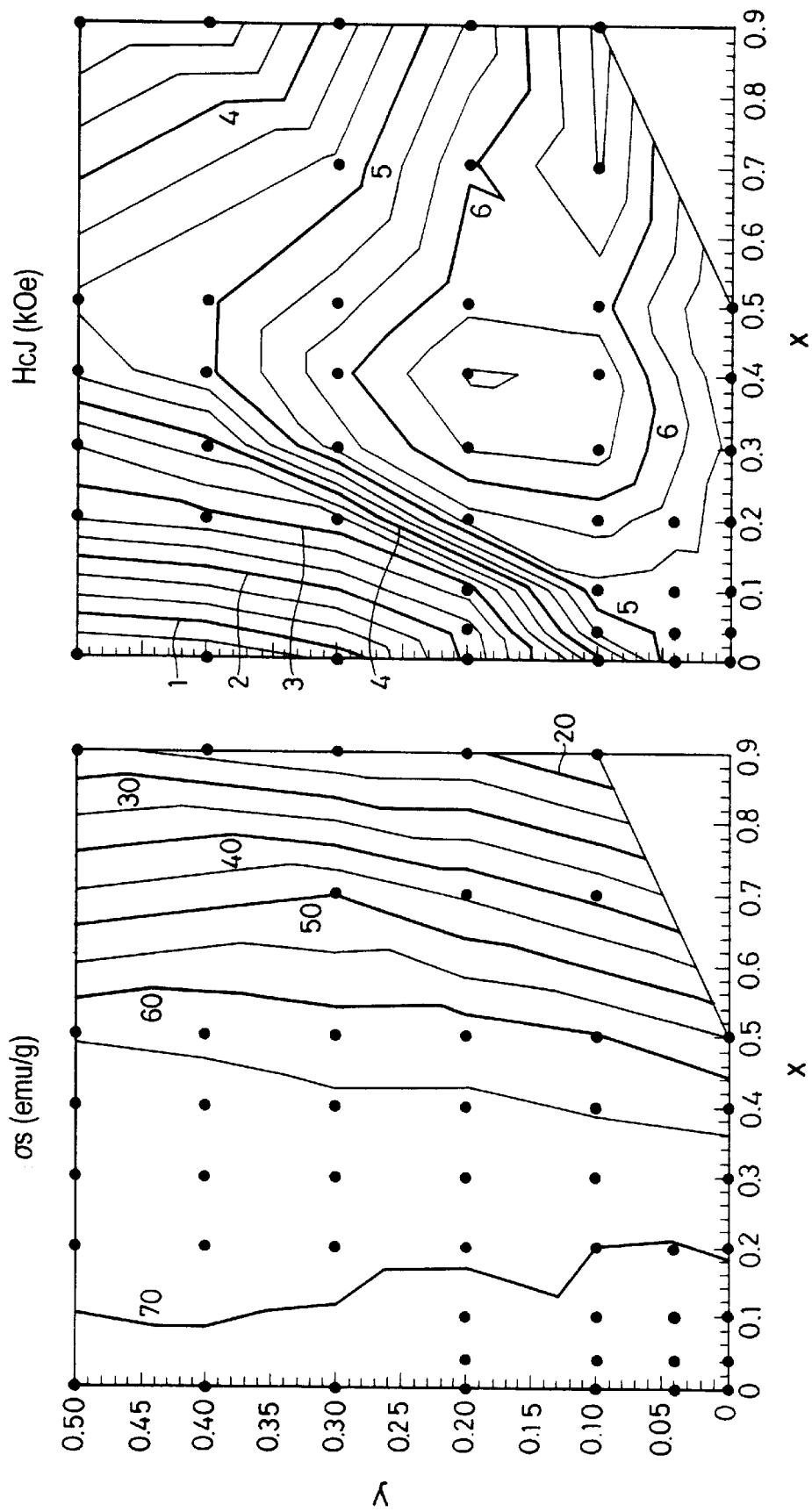
FIG. 26 graphically shows magnetic properties ((s and HcJ) of calcined bodies at a calcining temperature of 1,250° C.
Figure 27:
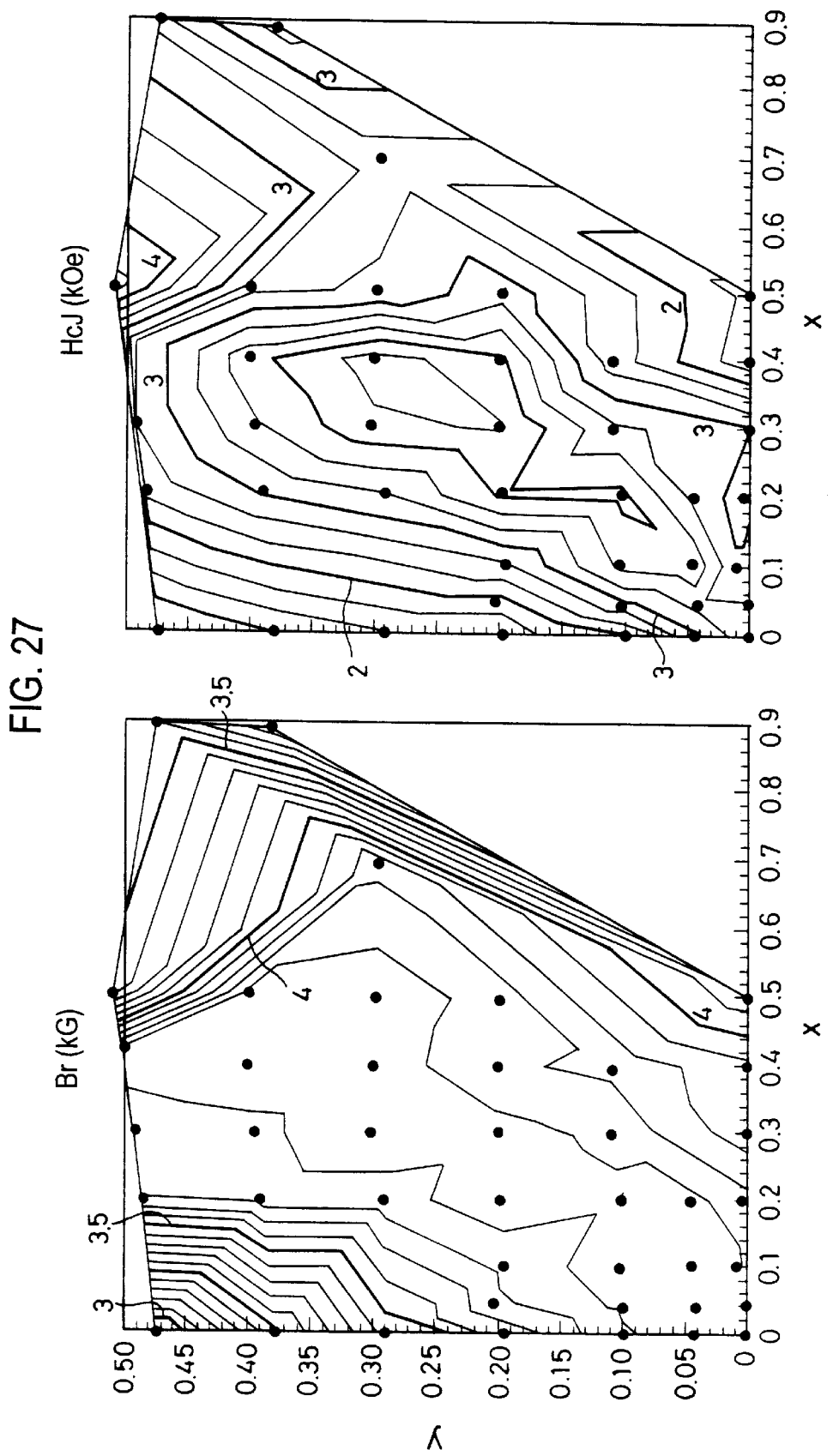
FIG. 27 graphically shows magnetic properties (Br and HcJ) of sintered bodies obtained by firing the calcined bodies of FIG. 26 in air at 1,220° C. for 1 hour.

FIG. 26 shows the magnetic properties (as and HcJ) of the calcined products. Table 11 shows the analytic values of the samples on test. The values of x, y and z computed from the analytic values are also shown in Table 11. In FIG. 27, the magnetic properties (Br and HcJ) of the sintered products obtained by firing in air at 1,220° C. for 1 hour were plotted as a function of x and y in Table 11. In FIG. 28, the values of the HcJ of sintered products obtained by firing at an oxygen concentration of 100% minus the HcJ of sintered products obtained by firing at an oxygen concentration of 20% were plotted.

TABLE 11

Analytic values of sintered products (at %)

| Sample | Fe | Mn | Sr | Ba | Si | Ca | La | Co | Al | Cr | x | y | z |
|---|---|---|---|---|---|---|---|---|---|---|---|---|---|
| 0* | 90.27 | 0.33 | 7.19 | 0.07 | 0.70 | 1.07 | 0.04 | 0.03 | 0.11 | 0.19 | 0.00 | 0.00 | 1.04 |
| 4004 | 89.91 | 0.35 | 7.01 | 0.07 | 0.70 | 1.10 | 0.30 | 0.31 | 0.11 | 0.14 | 0.04 | 0.04 | 1.03 |
| 401 | 89.48 | 0.35 | 6.96 | 0.07 | 0.70 | 1.10 | 0.29 | 0.75 | 0.10 | 0.18 | 0.04 | 0.10 | 1.04 |
| 402 | 88.79 | 0.35 | 6.86 | 0.07 | 0.68 | 1.04 | 0.34 | 1.53 | 0.10 | 0.23 | 0.05 | 0.20 | 1.05 |
| 1004 | 89.90 | 0.35 | 6.51 | 0.06 | 0.69 | 1.10 | 0.75 | 0.33 | 0.10 | 0.19 | 0.10 | 0.04 | 1.03 |
| 101 | 89.43 | 0.35 | 6.56 | 0.06 | 0.70 | 1.11 | 0.73 | 0.77 | 0.10 | 0.18 | 0.10 | 0.10 | 1.03 |
| 102 | 88.86 | 0.35 | 6.44 | 0.06 | 0.69 | 1.05 | 0.73 | 1.47 | 0.10 | 0.22 | 0.10 | 0.20 | 1.05 |
| 2004 | 89.86 | 0.35 | 5.85 | 0.06 | 0.69 | 1.11 | 1.45 | 0.33 | 0.10 | 0.17 | 0.20 | 0.04 | 1.03 |
| 201 | 89.42 | 0.34 | 5.86 | 0.06 | 0.71 | 1.11 | 1.48 | 0.75 | 0.12 | 0.15 | 0.20 | 0.10 | 1.02 |
| 202 | 88.69 | 0.34 | 5.84 | 0.06 | 0.70 | 1.11 | 1.47 | 1.49 | 0.10 | 0.18 | 0.20 | 0.19 | 1.03 |
| 203 | 88.13 | 0.35 | 5.74 | 0.06 | 0.68 | 1.05 | 1.44 | 2.19 | 0.11 | 0.24 | 0.20 | 0.29 | 1.05 |
| 204 | 87.37 | 0.34 | 5.73 | 0.06 | 0.68 | 1.04 | 1.44 | 2.92 | 0.16 | 0.24 | 0.20 | 0.39 | 1.05 |
| 205 | 86.71 | 0.34 | 5.72 | 0.06 | 0.69 | 1.04 | 1.44 | 3.64 | 0.11 | 0.25 | 0.20 | 0.48 | 1.05 |
| 301 | 89.37 | 0.34 | 5.11 | 0.05 | 0.70 | 1.11 | 2.18 | 0.81 | 0.11 | 0.19 | 0.30 | 0.11 | 1.03 |
| 302 | 88.65 | 0.34 | 5.14 | 0.05 | 0.69 | 1.11 | 2.22 | 1.50 | 0.10 | 0.17 | 0.30 | 0.20 | 1.02 |
| 303 | 87.97 | 0.34 | 5.16 | 0.05 | 0.68 | 1.10 | 2.22 | 2.27 | 0.10 | 0.15 | 0.30 | 0.30 | 1.02 |
| 304 | 87.27 | 0.34 | 5.07 | 0.05 | 0.69 | 1.08 | 2.18 | 2.96 | 0.10 | 0.23 | 0.30 | 0.39 | 1.04 |
| 305 | 86.57 | 0.34 | 5.06 | 0.05 | 0.69 | 1.06 | 2.17 | 3.69 | 0.10 | 0.25 | 0.30 | 0.49 | 1.04 |
| 401 | 89.45 | 0.34 | 4.39 | 0.04 | 0.70 | 1.09 | 2.87 | 0.81 | 0.09 | 0.21 | 0.40 | 0.11 | 1.04 |
| 402 | 88.72 | 0.33 | 4.41 | 0.04 | 0.71 | 1.09 | 2.92 | 1.50 | 0.10 | 0.16 | 0.40 | 0.20 | 1.03 |
| 403 | 87.98 | 0.33 | 4.40 | 0.04 | 0.71 | 1.09 | 2.92 | 2.25 | 0.10 | 0.16 | 0.40 | 0.30 | 1.03 |
| 404 | 87.20 | 0.33 | 4.40 | 0.04 | 0.73 | 1.10 | 2.92 | 3.00 | 0.12 | 0.15 | 0.40 | 0.40 | 1.03 |
| 405 | 86.06 | 0.34 | 4.40 | 0.04 | 0.69 | 1.09 | 2.92 | 3.71 | 0.10 | 0.16 | 0.42 | 0.50 | 1.10 |
| 502 | 88.71 | 0.34 | 3.66 | 0.04 | 0.69 | 1.09 | 3.61 | 1.49 | 0.16 | 0.19 | 0.50 | 0.20 | 1.03 |
| 503 | 87.99 | 0.33 | 3.62 | 0.04 | 0.69 | 1.09 | 3.61 | 2.23 | 0.22 | 0.17 | 0.50 | 0.30 | 1.04 |
| 504 | 87.13 | 0.33 | 3.60 | 0.04 | 0.69 | 1.11 | 3.66 | 2.99 | 0.27 | 0.17 | 0.50 | 0.40 | 1.03 |
| 505 | 86.42 | 0.33 | 3.61 | 0.04 | 0.69 | 1.11 | 3.66 | 3.74 | 0.24 | 0.16 | 0.50 | 0.51 | 1.01 |
| 703 | 88.14 | 0.34 | 2.17 | 0.03 | 0.69 | 1.08 | 5.00 | 2.22 | 0.08 | 0.24 | 0.70 | 0.30 | 1.05 |
| 904 | 87.60 | 0.35 | 0.77 | 0.01 | 0.66 | 1.04 | 6.25 | 2.86 | 0.12 | 0.34 | 0.89 | 0.38 | 1.07 |
| 905 | 86.85 | 0.35 | 0.71 | 0.01 | 0.68 | 1.05 | 6.26 | 3.57 | 0.10 | 0.41 | 0.90 | 0.47 | 1.08 |
| LF004* | 90.29 | 0.35 | 6.87 | 0.07 | 0.70 | 1.10 | 0.32 | 0.01 | 0.08 | 0.20 | 0.04 | 0.00 | 1.05 |
| LF01* | 90.29 | 0.35 | 6.46 | 0.07 | 0.70 | 1.10 | 0.74 | 0.01 | 0.09 | 0.19 | 0.10 | 0.10 | 1.05 |
| LF02* | 90.28 | 0.35 | 5.78 | 0.06 | 0.69 | 1.09 | 1.46 | 0.00 | 0.08 | 0.18 | 0.20 | 0.00 | 1.04 |
| LF03* | 90.84 | 0.35 | 5.08 | 0.05 | 0.71 | 1.11 | 2.19 | 0.00 | 0.09 | 0.20 | 0.30 | 0.00 | 1.04 |
| LF04* | 90.29 | 0.35 | 4.29 | 0.05 | 0.69 | 1.09 | 2.88 | 0.00 | 0.09 | 0.27 | 0.40 | 0.00 | 1.05 |
| LF05* | 90.31 | 0.35 | 3.55 | 0.04 | 0.69 | 1.09 | 3.57 | 0.00 | 0.09 | 0.29 | 0.50 | 0.00 | 1.06 |
| Co2* | 89.97 | 0.35 | 7.19 | 0.07 | 0.68 | 1.10 | 0.03 | 0.32 | 0.08 | 0.19 | 0.00 | 0.04 | 1.04 |
| Co3* | 89.54 | 0.35 | 7.22 | 0.08 | 0.69 | 1.09 | 0.00 | 0.74 | 0.08 | 0.19 | 0.00 | 0.10 | 1.04 |
| Co4* | 88.80 | 0.36 | 7.15 | 0.07 | 0.67 | 1.07 | 0.01 | 1.47 | 0.09 | 0.30 | 0.00 | 0.20 | 1.05 |
| Co5* | 88.12 | 0.36 | 7.12 | 0.08 | 0.69 | 1.07 | 0.00 | 2.18 | 0.09 | 0.27 | 0.00 | 0.29 | 1.06 |
| Co6* | 87.44 | 0.35 | 7.12 | 0.07 | 0.67 | 1.08 | 0.00 | 2.85 | 0.09 | 0.30 | 0.00 | 0.38 | 1.08 |
| Co7* | 86.66 | 0.35 | 7.16 | 0.07 | 0.69 | 1.1Q | 0.00 | 3.56 | 0.09 | 0.30 | 0.00 | 0.47 | 1.05 |

*comparison

As is evident from these figures, high magnetic properties are obtained within the scope of the invention. When analyzed by x-ray diffractometry, the presence of magnetoplumbite phase (M phase) was confirmed at all points.

It is seen from FIGS. 27 and 28 that high HcJ is obtained when x/y is from 1.3 to 2. Also, within this range, the dependency of HcJ on the firing atmosphere is reduced.

Example 15
(Ferrite particles for bonded magnets)

The calcined products wherein x=y=0 (Comparison) and x=y=0.3 (Invention) obtained in Example 14 were comminuted in a dry vibrating mill and then annealed in air at 1,000° C. for 5 minutes. At this point, the ferrite particles were measured for HcJ and the temperature property of HcJ. Using a VSM, a commercially available plastic magnet were similarly measured for HcJ and the temperature property of HcJ. The results are shown below.

TABLE 12

| Sample | HCJ (kOe) | ΔHcJ/HcJ (Oe/° C.) |
|---|---|---|
| Example as comminuted | 2.10 | 0.8 |
| Example as annealed | 4.31 | −1.6 |
| Comparative Example as comminuted | 1.75 | 1.5 |
| Comparative Example as annealed | 3.96 | 3.9 |
| Comparative Example (commercial plastic magnet) | 3.18 | 4.4 |

As is evident from the above Table, the inventive sample is improved in HcJ and the temperature property of HcJ.

The above-prepared ferrite particles for bonded magnets were surface treated by adding a silane coupling agent. The treated ferrite particles, 90 parts by weight, was blended with 10 parts by weight of nylon 12, kneaded, and granulated. Thereafter, the mix was molded in a magnetic field by an injection molding machine, and the molded part was measured for magnetic properties. As a result, it was found that the temperature property of HcJ was improved as in the above Example.

Example 16

(Application of sintered magnet)

C-shaped sintered magnets for motors were obtained as in Example 1 except that the shape of the inventive samples was changed from the cylindrical shape for measurement to the shape of field magnets for C-shaped motors. The thus obtained cores were incorporated in motors instead of sintered magnets of conventional material, and the motors were operated under the rated conditions to find satisfactory performance. Upon torque measurement, the torque was found greater than the motor using the core of conventional material.

The effectiveness of the invention has been demonstrated by the foregoing Examples.

INDUSTRIAL APPLICABILITY

By increasing both the saturation magnetization and magnetic anisotropy of a hexagonal ferrite, the invention provides a ferrite magnet having a high remanence and a high coercivity which are unachievable with prior art hexagonal ferrite magnets. Another object of the invention is to provide a ferrite magnet having a high remanence and a high coercivity as well as significantly improved temperature dependency of the coercivity and experiencing a minimized drop of coercivity even in a low temperature range. A further object of the invention is to provide a ferrite magnet having a high remanence and a high coercivity using relatively coarse ferrite particles with a particle diameter in excess of 1 $\mu$m. A still further object of the invention is to provide a magnetic recording medium having a high remanence. Yet another object of the invention is to provide a motor featuring a high efficacy and high torque which can be reduced in size and weight.

What is claimed is:

1. An oxide magnetic material comprising a primary phase of ferrite with a hexagonal structure and having a composition containing A, R, Fe, and M wherein A is at least one element selected from the group consisting of strontium, barium, calcium and lead, with strontium being essentially contained in A, R is at least one element selected from the group consisting of bismuth and rare earth elements inclusive of yttrium, with lanthanum being essentially contained in R, and M is cobalt or cobalt and zinc, the proportions in total of the respective elements relative to the quantity of the entire metal elements are A: 1 to 13 at %,
R: 0.05 to 10 at %,
Fe: 80 to 95 at %, and
M: 0.5 to 3 at %.

2. The oxide magnetic material of claim 1 which is represented by formula (I):

$A_{1-x}R_x(Fe_{12-y}M_y)_zO_{19}$ wherein $0.04 \leq x \leq 0.9$, $0.1 > y \geq 0.5$, and $0.7 \leq z \leq 1.2$.

3. The oxide magnetic material of claim 1 wherein the proportion of cobalt in M is at least 10 at %.

4. Ferrite particles comprising the oxide magnetic material of claim 1.

5. The ferrite particles of claim 4 wherein the oxide magnetic material is represented by formula (I):

$A_{1-x}R_x(Fe_{12-y}M_y)_zO_{19}$ wherein $0.04 \leq x \leq 0.9$, $0.04 \leq y \leq 0.5$, $0.8 \leq x/y \leq 20$, and $0.7 \leq z \leq 1.2$.

6. Ferrite particles comprising A, R, Fe, and M wherein

A is at least one element selected from the group consisting of strontium, barium, calcium and lead, with strontium being essentially contained in A, R is at least one element selected from the group consisting of bismuth and rare earth elements inclusive of yttrium, with lanthanum being essentially contained in R, and M is cobalt or cobalt and zinc, said ferrite particles having an intrinsic coercivity (HcJ) and a temperature dependency of coercivity (Oe/° C.) which satisfy the formula (III):

$|\Delta HcJ/\Delta T| \leq 5/3 HcJ - 7/3$ wherein $|\Delta HcJ/\Delta T|$ represents the magnitude of the temperature dependency (Oe/° C.) of the intrinsic coercivity (HcJ) between −50° C. and 50° C., and the unit of HcJ is expressed in kOe.

7. A bonded magnet comprising the ferrite particles of claim 4.

8. A sintered magnet comprising the oxide magnetic material of claim 1.

9. The sintered magnet of claim 8 wherein the oxide magnetic material is represented by formula (II):

$A_{1-x}R_x(Fe_{12-y}M_y)_zO_{19}$ wherein $0.04 \leq x \leq 0.9$, $0.04 \leq y \leq 0.5$, $0.4 \leq x/y \leq 4$, and $0.7 \leq z \leq 1.2$.

10. The sintered magnet of claim 8 having an intrinsic coercivity HcJ (unit koe) and a remanence Br (unit kG) at 25° C. which satisfy the formula (IV):

$Br + \frac{1}{3} HcJ \geq 5.75$ when $HcJ \geq 4$, and the formula (V):

$Br + \frac{1}{10} HcJ \geq 4.82$ when $HcJ < 4$.

11. The sintered magnet of claim 8 having a coercivity HcJ (unit kOe) and a remanence Br (unit kG) at −25° C. which satisfy the formula (VI):

$Br + \frac{1}{3} HcJ \geq 5.95$.

12. The sintered magnet of claim 8 wherein the magnitude of a temperature coefficient of coercivity between −50° C. and 50° C. is up to 0.25%/° C.

13. A sintered magnet comprising A, R, Fe, and M wherein

A is at least one element selected from the group consisting of strontium, barium, calcium and lead, with strontium being essentially contained in A, R is at least one element selected from the group consisting of bismuth and rare earth elements inclusive of yttrium, with lanthanum being essentially contained in R, and M is cobalt or cobalt and zinc,
said sintered magnet having a coercivity HcJ (unit kOe) and a remanence Br (unit kG) which satisfy the formula (IV):

$$Br + \tfrac{1}{3}HcJ \geq 5.75$$

when HcJ≧4, and the formula (V):

$$Br + \tfrac{1}{10}HcJ \geq 4.82$$

when HcJ<4.

14. A sintered magnet comprising A, R, Fe, and M wherein
   A is at least one element selected from the group consisting of strontium, barium, calcium and lead, with strontium being essentially contained in A,
   R is at least one element selected from the group consisting of bismuth and rare earth elements inclusive of yttrium, with lanthanum being essentially contained in R, and
   M is cobalt or cobalt and zinc, said sintered magnet having a coercivity HcJ (unit kOe) and a remanence Br (unit kG) at −25° C. which satisfy the formula (VI):

$$Br + \tfrac{1}{3}HcJ \geq 5.95.$$

15. A motor comprising the sintered magnet of claim 8.

16. A magnetic recording medium comprising a thin film magnetic layer containing the oxide magnetic material of claim 1.

* * * * *

UNITED STATES PATENT AND TRADEMARK OFFICE
CERTIFICATE OF CORRECTION

| | |
|---|---|
| PATENT NO. : 6,139,766 | |
| DATED : October 31, 2000 | |
| INVENTOR(S) : Hitoshi Taguchi, et al | |

It is certified that error appears in the above-identified patent and that said Letters Patent is hereby corrected as shown below:

On the title page, item [75] the third Inventor's name is incorrect, item [75] should read as follows:

--[75] Inventors: Hitoshi Taguchi; Kazumasa Iida; Kiyoyuki Masuzawa; Yoshihiko Minachi, all of Chiba, Japan On the title page, item [87] the PCT Publication Date is incorrect, item [87] should read as follows:

[87] PCT Pub. No.: WO98/38654
PCT Pub. Date: Sept. 3, 1998

Signed and Sealed this

Nineteenth Day of June, 2001

*Attest:*

Nicholas P. Godici

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.    : 6,139,766
DATED         : October 31, 2000
INVENTOR(S)   : Hitoshi Taguchi et al.

It is certified that error appears in the above-identified patent and that said Letters Patent is hereby corrected as shown below:

<u>Title page,</u>
Item [54], "OXIDE MAGNETIC MATERIAL, FERRITE PARTICLE, SINTERED MAGNET, BONDED MAGNET, MAGNETIC RECORDING MEDIUM AND MOTOR" should read -- OXIDE MAGNETIC MATERIAL, FERRITE PARTICLES, SINTERED MAGNET, BONDED MAGNET, MAGNETIC RECORDING MEDIUM, AND MOTOR --.

<u>Column 29,</u>
Line 65, "$_xR_x(Fe_{12-y}M_y)_zO_{19}$" should read -- $A_{1-x}R_x(Fe_{12-y}M_y)_zO_{19}$ --;
Line 66, "$0.1 > y \geq 0.5$," should read -- $0.1 \leq y \leq 0.4$ --.

<u>Column 30,</u>
Line 46, "$Hcj \geq 4$" should read -- $HcJ \geq 4$ --.

Signed and Sealed this

Ninth Day of July, 2002

Attest:

*Attesting Officer*

JAMES E. ROGAN
*Director of the United States Patent and Trademark Office*